(12) United States Patent
Jeong

(10) Patent No.: US 8,787,713 B2
(45) Date of Patent: Jul. 22, 2014

(54) OPTICAL DEVICE, OPTICAL HYBRID CIRCUIT, AND OPTICAL RECEIVER

(75) Inventor: Seok-Hwan Jeong, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 102 days.

(21) Appl. No.: 12/956,156

(22) Filed: Nov. 30, 2010

(65) Prior Publication Data
US 2011/0129236 A1 Jun. 2, 2011

(30) Foreign Application Priority Data
Dec. 1, 2009 (JP) ................. 2009-273778

(51) Int. Cl.
G02F 1/035 (2006.01)
G02B 6/26 (2006.01)

(52) U.S. Cl.
CPC ...................... G02B 6/26 (2013.01)
USPC .............. 385/32; 385/14; 385/43; 385/129; 385/130; 385/132; 398/212

(58) Field of Classification Search
USPC .......... 385/1, 2, 3, 14, 31, 39, 40, 27, 28, 29, 385/129, 130, 131, 132, 43; 398/212
See application file for complete search history.

(56) References Cited

U.S. PATENT DOCUMENTS

| 5,333,219 A * | 7/1994 | Kuznetsov ...................... 385/45 |
| 5,933,554 A * | 8/1999 | Leuthold et al. ................ 385/28 |
| 6,512,864 B1 * | 1/2003 | Lin et al. ......................... 385/24 |
| 6,549,696 B1 * | 4/2003 | Uetsuka et al. ................. 385/24 |
| 6,892,021 B2 * | 5/2005 | Doerr ............................ 385/140 |
| 7,916,981 B2 * | 3/2011 | Kawano et al. .................... 385/1 |
| 8,306,369 B2 * | 11/2012 | Jeong ............................... 385/2 |
| 2006/0120657 A1 * | 6/2006 | Little .............................. 385/11 |
| 2009/0003757 A1 * | 1/2009 | Mizumoto et al. ................ 385/3 |
| 2011/0129236 A1 * | 6/2011 | Jeong ............................ 398/212 |

FOREIGN PATENT DOCUMENTS

| JP | 06-130337 | 5/1994 |
| JP | 7-281041 | 10/1995 |
| JP | 2004-144963 | 5/2004 |
| JP | 2005-107229 | 4/2005 |
| JP | 2005-249973 | 9/2005 |
| JP | 2005-300679 | 10/2005 |

OTHER PUBLICATIONS

Japanese Office Action mailed Feb. 26, 2013 for corresponding Japanese Application No. 2009-273778, with English-language translation.

* cited by examiner

*Primary Examiner* — Charlie Peng
(74) *Attorney, Agent, or Firm* — Fujitsu Patent Center

(57) ABSTRACT

According to aspects of embodiments, an optical device includes a first coupler configured to split an optical signal; a second coupler configured to cause optical signals to interfere with each other, a first waveguide configured to couple the first coupler to the second coupler, the first waveguide includes a first phase shifter region having a section narrower in width than an end of the first phase shifter region, the second waveguide includes a second phase shifter region having a section wider in width than an end of the second phase shifter region.

8 Claims, 24 Drawing Sheets

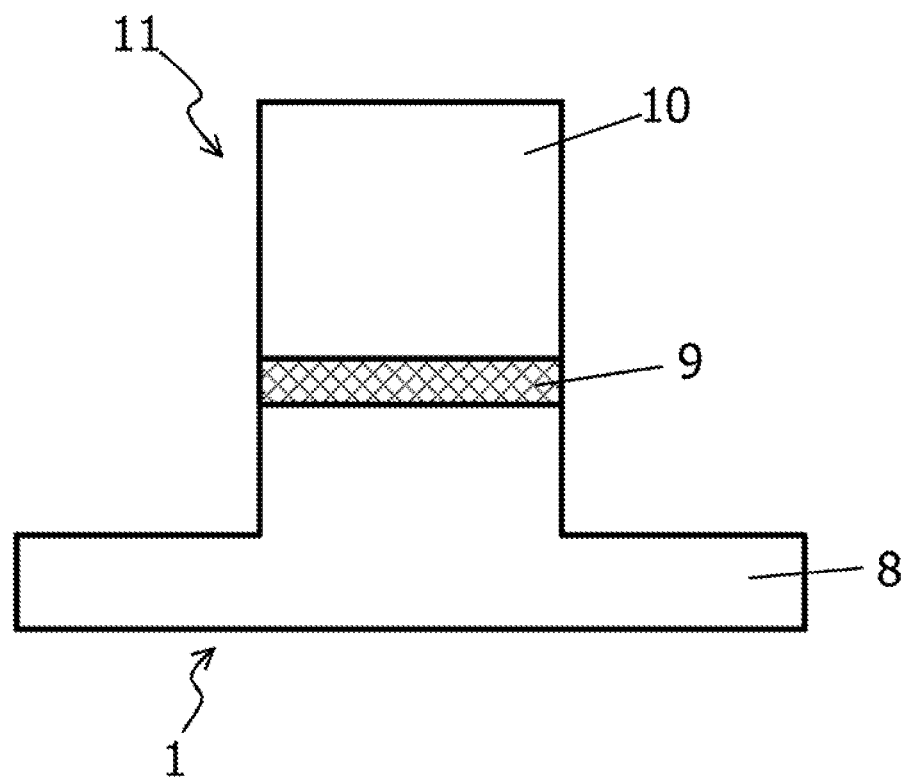

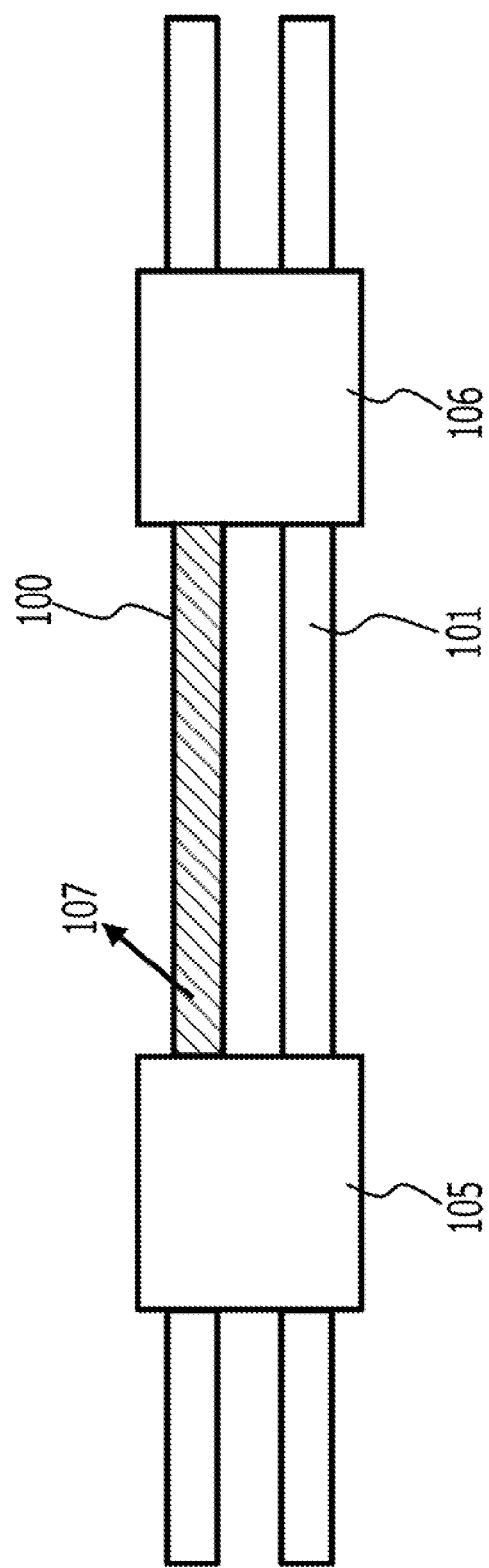

OPTICAL DEVICE, OPTICAL HYBRID CIRCUIT, AND OPTICAL RECEIVER

CROSS-REFERENCE TO RELATED APPLICATIONS

This application is based upon and claims the benefit of priority from the prior Japanese Patent Application No. 2009-273778 filed on Dec. 1, 2009, the entire contents of which are incorporated herein by reference.

FIELD

The embodiments relate to an optical device, an optical hybrid circuit, and an optical receiver.

BACKGROUND

An optical system includes an optical device that is based on interference between optical signals having a phase difference. Interference, as used herein, refers to, for example, the addition or superposition of two or more optical signals. Such optical devices include an optical splitting device for splitting an optical signal at any ratio, and a Mach-Zehnder optical modulator.

FIGS. 22 and 23 illustrate optical splitting devices for providing an arbitrary splitting ratio. At least one of two waveguides 100 and 101 arranged between two 2:2 optical couplers 105 and 106 includes a phase shifter region causing a phase difference between split optical signals.

As illustrated in FIG. 22, phase shifter regions 102 and 103, narrowed in the waveguide width, are respectively arranged on the two waveguides 100 and 101. The two phase shifter regions 102 and 103 are thus different in waveguide shape. A splitting ratio is provided on such an optical splitting device by adjusting the length of a linear narrow-width waveguide section of the one phase shifter region 102 or by adjusting a taper angle of a tapered waveguide section of the other phase shifter region 103.

The optical splitting device FIG. 23 includes a phase shifter region 104 having a width-tapered section on part of one waveguide 101, out of the two waveguides 100 and 101. An arbitrary splitting ratio can be provided on such an optical splitting device by adjusting the length or the taper angle of the width-tapered section of the waveguide in the phase shifter region 104.

SUMMARY

According to aspects of embodiments, an optical device includes a first coupler configured to split an optical signal, a second coupler configured to cause optical signals to interfere with each other, a first waveguide configured to couple the first coupler to the second coupler, the first waveguide includes a first phase shifter region having a section narrower in width than an end of the first phase shifter region, and a second waveguide configured to couple the first coupler to the second coupler, the second waveguide includes a second phase shifter region having a section wider in width than an end of the second phase shifter region.

The object and advantages of the invention will be realized and attained by at least the elements, features, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagrammatic sectional view of the optical device of the first embodiment;

FIG. 24 diagrammatically illustrates an optical splitting device.

DESCRIPTION OF EMBODIMENTS

Preferred embodiments will be explained with reference to accompanying drawings.

An optical device typically includes a phase shifter region giving a phase difference to split optical signals. If a width and an angle of a waveguide in the phase shifter region deviate from specified values in a manufacturing process, specified characteristics are not obtained. Degraded characteristics thus result. It is also difficult to achieve a sufficient manufacturing tolerance in the optical device.

It is desirable to control deterioration of the characteristics and to achieve a sufficient manufacturing tolerance even if a width and an angle of a waveguide in the phase shifter region deviate from specified values in a manufacturing process.

An optical device, an optical hybrid circuit, and an optical receiver related to the embodiments are described below with reference to the drawings.

An optical device of a first embodiment is described below with reference to FIGS. 1-10.

The optical device of the first embodiment may be used in an optical communication system, and based on interference of optical signals having a phase difference therebetween. The optical device includes a circuit for causing optical signals to interfere with each other, and is thus also called an optical interference circuit. As discussed herein, "causing optical signals to interfere with each other" refers to, for example, the addition or superposition of two or more optical signals.

According to the first embodiment, an optical splitting device capable of splitting, at any ratio, an optical signal to perform a variety of optical signal processing in the optical communication system is disclosed. The optical splitting device has a structure of a Mach-Zehnder interferometer and is thus also referred to as a Mach-Zehnder optical device or a Mach-Zehnder optical circuit. The optical splitting device may also be referred to as an optical interference circuit.

Figure 1:
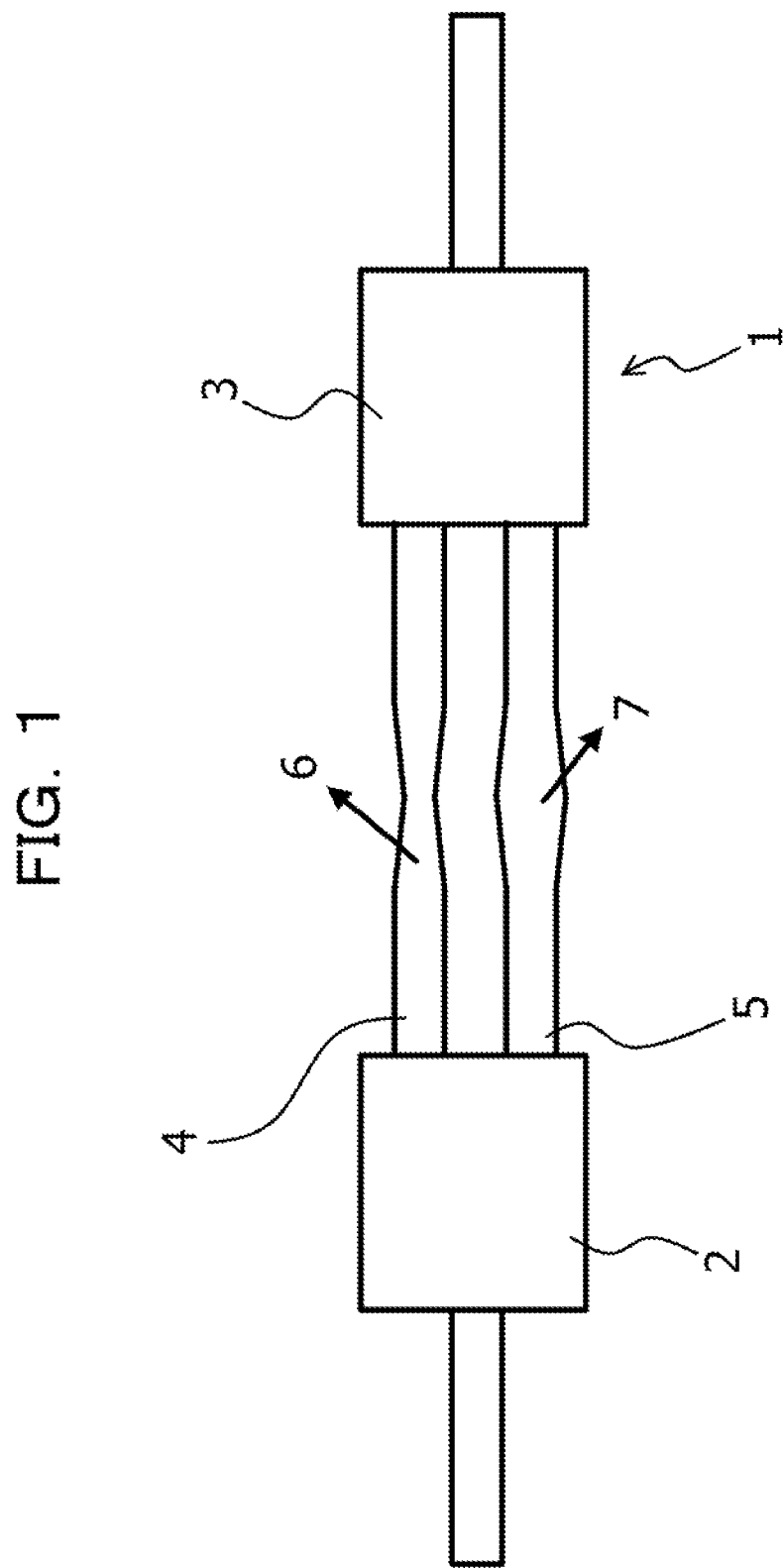
FIG. 1 diagrammatically illustrates an optical device of a first embodiment.

According to the first embodiment as illustrated in FIG. 1, an optical splitting device 1 is an optical semiconductor device having a semiconductor waveguide structure. The optical splitting device 1 includes an input optical coupler 2, an output optical coupler 3, and two optical waveguides 4 and 5 coupling the optical couplers 2 and 3. The input optical coupler 2 is referred to as a first coupler, and the output optical coupler 3 is referred to as a second coupler. The two optical waveguides 4 and 5 are respectively referred to as a first waveguide 4 and a second waveguide 5.

The input optical coupler 2 is a 1:2 optical coupler for splitting an optical signal, and has one channel at the input side thereof and two channels at the output side thereof. More specifically, the input optical coupler 2 is a 1:2 multi-mode interference (MMI) coupler. The input optical coupler 2 is not limited to an MMI coupler. For example, the input optical coupler 2 may be a two-mode interference coupler.

The output optical coupler 3 causes optical signals to interfere with each other, and is a 2:1 optical coupler having two channels at the input side thereof and one channel at the output side thereof. More specifically, the output optical coupler 3 is a 2:1 MMI coupler. The output optical coupler 3 is not limited to an MMI coupler. For example, the output optical coupler 3 may be a two-mode interference coupler.

The first waveguide 4 and the second waveguide 5 causes the optical signals, split through the input optical coupler 2, to propagate independently, thereby guiding the optical signals to the output optical coupler 3. The first waveguide 4 and the second waveguide 5 are a pair of waveguides substantially identical in laminate structure, and width and length dimensions except for phase shifter regions 6 and 7 as described below.

According to the first embodiment, part of the first waveguide 4 serves as the phase shifter region 6 functioning as a phase shifter and part of the second waveguide 5 serves as the phase shifter region 7 functioning as a phase shifter.

The phase shifter region 6 and the phase shifter region 7 gives rise to a phase difference between the optical signals propagating through the first waveguide 4 and the second waveguide 5, respectively. The phase shifter region 6 and the phase shifter region 7 have a function of phase-shifting the optical signals and adjusting the phase difference to a specified phase difference value. The phase shifter region 6 and the phase shifter region 7 having this function may split the optical signal at a specified ratio by varying optical path lengths to adjust the optical path lengths to a specified optical path length difference.

According to the first embodiment, the phase shifter region 6 and the phase shifter region 7, which cause a phase difference between the optical signals, have different waveguide shapes as described below.

Figure 2:
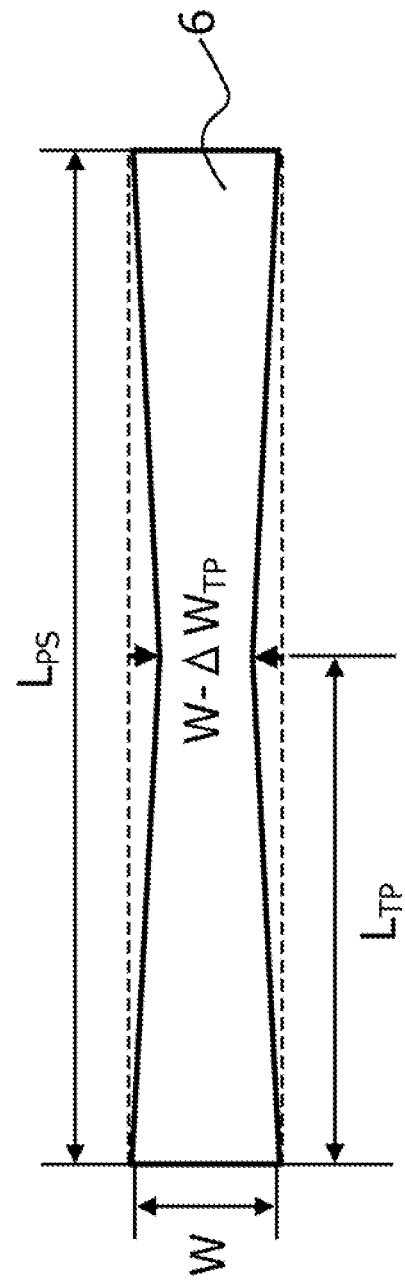
FIG. 2 diagrammatically illustrates a narrow-width-tapered waveguide type phase shifter in the optical device of the first embodiment.

As illustrated in FIG. 2, the first phase shifter region 6 linearly narrows in waveguide width as the first phase shifter region 6 extends lengthwise from the input end of the first shifter region 6 toward the lengthwise center position of the first phase shifter region 6. The first phase shifter region 6 then widens in waveguide width as the first phase shifter region 6 extends lengthwise from the lengthwise center position of the first phase shifter region 6 to the output end of the first phase shifter region 6. The first phase shifter region 6 has thus a narrow-width-tapered structure and is also referred to as a narrow-width-tapered phase shifter region 6. The first phase shifter region 6 phase-shifts the optical signal in a direction that the phase of the first optical signal is delayed. The first phase shifter region 6, having a width-tapered waveguide having a linear tapered shape, is also referred to as a linear tapered type waveguide. The first waveguide 4 includes the first phase shifter region 6 having a section narrower than the end section of the first phase shifter 6. According to the first embodiment, the first phase shifter region 6 has the narrowest width at the lengthwise center position of the first phase shifter region 6, and has thus a waveguide structure symmetrical with respect to the lengthwise center position.

Let W represent the waveguide width at the input end and the output end of the narrow-width-tapered phase shifter 6. The waveguide width W at the input end and the output end of the phase shifter region 6 is substantially equal to the waveguide width of the rest of the first waveguide 4.

Let $\Delta W_{TP}$ represent a difference between the waveguide width at the input end and the output end of the narrow-width-tapered phase shifter 6 and the waveguide width at the lengthwise center position of the narrow-width-tapered phase shifter 6. That is, $\Delta W_{TP}$ represents an amount of change of the waveguide width of the narrow-width-tapered phase shifter 6. $|\Delta W_{TP}|/W$ represents a rate of change of the waveguide width of the narrow-width-tapered phase shifter 6, and is a parameter related to an angle of a taper shape. The waveguide width at the lengthwise center position of the narrow-width-tapered phase shifter 6 is $W-\Delta W_{TP}$.

$L_{TP}$ represents a length from one of the input end and the output end to the lengthwise center position on the narrow-width-tapered phase shifter 6. That is, $L_{TP}$ represents a taper length of the narrow-width-tapered phase shifter 6. $L_{PS}$ represents a length from the input end to the output end of the narrow-width-tapered phase shifter 6, i.e., a phase shifter length.

Figure 3:
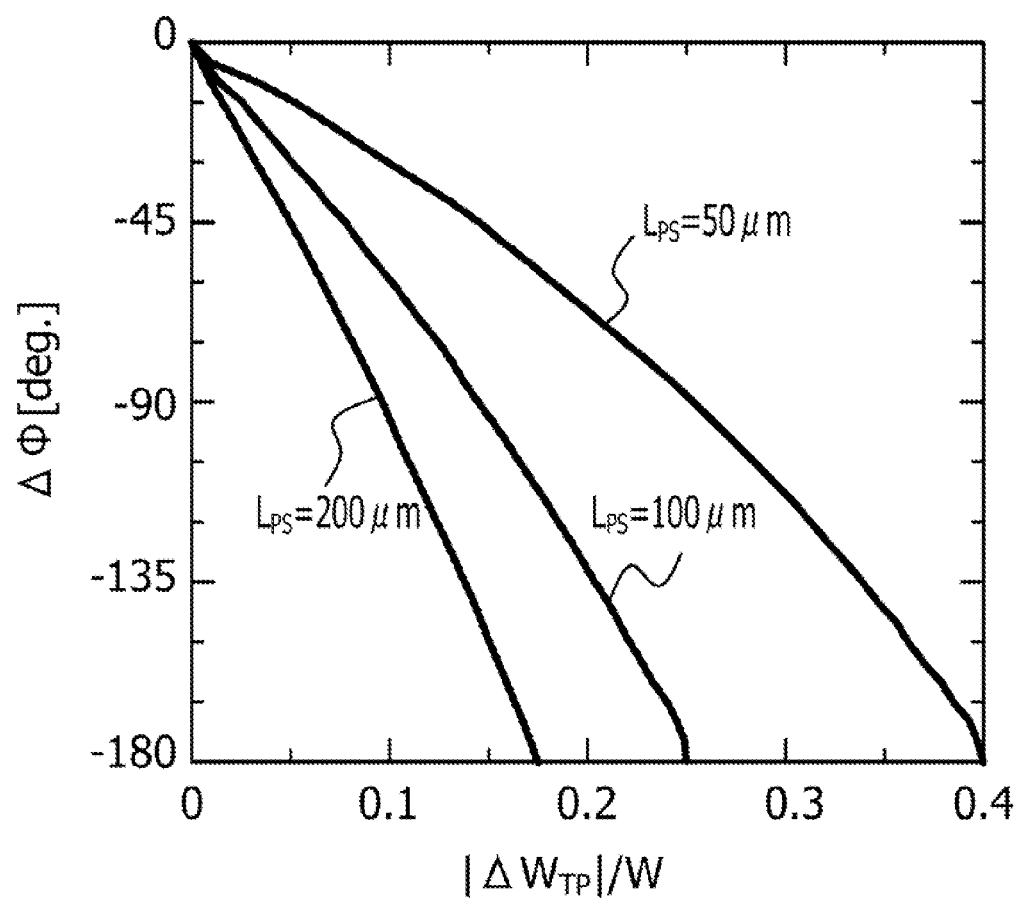
FIG. 3 illustrates a relationship between a rate of change of the width of a waveguide and an amount of phase change in the narrow-width-tapered waveguide type phase shifter in the optical device of the first embodiment.

FIG. 3 illustrates a relationship between a rate of change $|\Delta W_{TP}|/W$ and an amount of phase change $\Delta\phi$ of the narrow-width-tapered phase shifter 6.

An amount of phase change $\Delta\phi$ depends on a variety of waveguide parameters. The waveguide width W is 2.0 μm, and $L_{PS}$ is twice the length of $L_{TP}$. The relationship between $\Delta\phi$ and $|\Delta W_{TP}|/W$ is plotted over a range of $\Delta W_{TP}$ changed from 0 μm to 0.8 μm with $L_{PS}$ set to 50 μm, 100 μm, and 200 μm. Since the phase of the optical signal delays on the narrow-width-tapered phase shifter 6, the value of $\Delta\phi$ is a negative value.

Referring to FIG. 3, the absolute value $\Delta\phi$ increases with the value $|\Delta W_{TP}|/W$, i.e., $|\Delta W_{TP}|$, increasing if $L_{PS}$ is set to 50 μm, 100 μm, and 200 μm. In other words, as the taper angle increases, the amount of phase change increases.

As $L_{PS}$ becomes shorter as illustrated in FIG. 3, a change of $\Delta\phi$ with respect to $|\Delta W_{TP}|/W$ becomes milder and more nonlinear. With $L_{PS}$ of 50 μm, a change of $\Delta\phi$ with respect to $|\Delta W_{TP}|/W$ becomes sharper in a region where $\Delta\phi$ is equal to or higher than 90 degrees than in a region where $\Delta\phi$ is lower than 90 degrees. Comparing to that with $L_{PS}$ of 100 μm or 200 μm, a change of $\Delta\phi$ is still mild in a region where $\Delta\phi$ is equal to or higher than 90 degrees With $L_{PS}$ of 50 μm.

In one embodiment, the length of the first phase shifter region 6, $L_{PS}$, is set to be about 50 μm or less.

Figure 4:
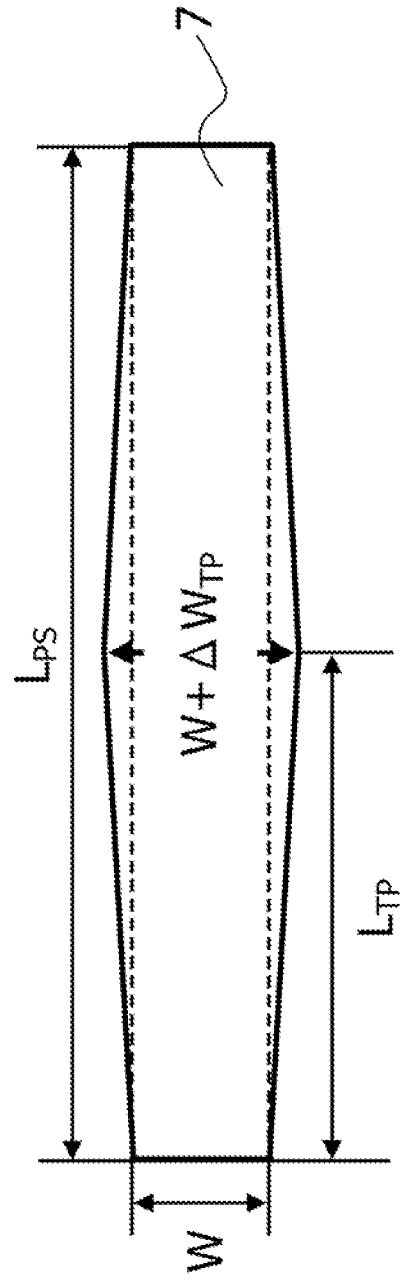
FIG. 4 diagrammatically illustrates a wide-width-tapered waveguide type phase shifter in the optical device of the first embodiment.

As illustrated in FIG. 4, the second phase shifter region 7 linearly widens in waveguide width as the second phase shifter region 7 extends lengthwise from the input end of the second phase shifter region 7 toward the lengthwise center position of the second phase shifter region 7. The second phase shifter region 7 then narrows in waveguide width as the second phase shifter region 7 extends lengthwise from the lengthwise center position of the second phase shifter region 7 to the input end of the second phase shifter region 7. The second phase shifter region 7 has thus a wide-width-tapered structure and is also referred to as a wide-width tapered phase shifter 7. The second phase shifter region 7 phase-shifts the optical signal in a direction that the phase of the optical signal advances. The second phase shifter region 7, which has a width-tapered waveguide having a linear tapered shape, is also referred to as a linear tapered type waveguide. The second waveguide 5 includes the second phase shifter region 7 having a section wider than the end of the second phase shifter region 7. According to the first embodiment, the second phase shifter region 7 has the widest width at the lengthwise center position of the second phase shifter region 7, and has thus a waveguide structure symmetrical with respect to the lengthwise center position.

Let W represent the waveguide width at the input end and the output end of the wide-width-tapered phase shifter 7. The waveguide width W at the input end and the output end of the wide-width-tapered phase shifter 7 is substantially equal to the waveguide width of the rest of the second waveguide 5.

Let $\Delta W_{TP}$ represent a difference between the waveguide width at the input end and the output end of the wide-width-tapered phase shifter 7 and the waveguide width at the lengthwise center position of the wide-width-tapered phase shifter 7. That is, $\Delta W_{TP}$ represents an amount of change of the waveguide width of the wide-width-tapered phase shifter 7. $|\Delta W_{TP}|/W$ represents a rate of change of the waveguide width of the wide-width-tapered phase shifter 7, and is a parameter related to an angle of a taper shape. The waveguide width at the lengthwise center position of the wide-width-tapered phase shifter 7 is $W+\Delta W_{TP}$.

$L_{TP}$ represents a length from one of the input end and the output end to the lengthwise center position on the wide-width-tapered phase shifter 7. That is, $L_{TP}$ represents a taper length. $L_{PS}$ represents a length from the input end to the output end of the wide-width-tapered phase shifter 7, i.e., a phase shifter length.

Figure 5:
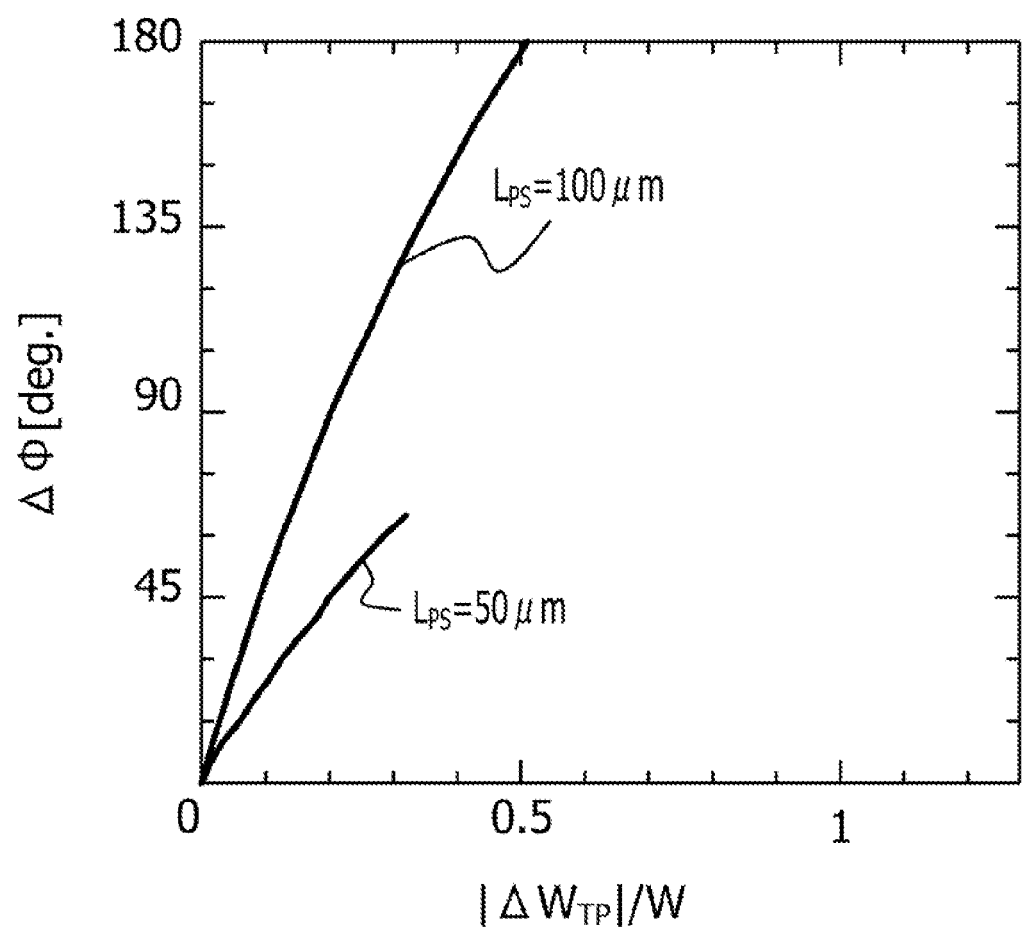
FIG. 5 illustrates a relationship between a rate of change of the width of a waveguide and an amount of phase change in the wide-width-tapered waveguide type phase shifter in the optical device of the first embodiment.

FIG. 5 illustrates a relationship between a rate of change $|\Delta W_{TP}|/W$ and an amount of phase change $\Delta\phi$ of the wide-width-tapered phase shifter 7.

An amount of phase change $\Delta\phi$ depends on a variety of waveguide parameters. The waveguide width W is 2.0 μm, and $L_{PS}$ is twice the length of $L_{TP}$. The relationship between $\Delta\phi$ and $|\Delta W_{TP}|/W$ is plotted over a range of $\Delta W_{TP}$ changed from 0 μm to 1.0 μm with $L_{PS}$ set to 50 μm and 100 μm. Since the phase of the optical signal advances on the wide-width-tapered phase shifter 7, the value of $\Delta\phi$ is a positive value.

Referring to FIG. 5, the value $\Delta\phi$ increases with the value $|\Delta W_{TP}|/W$, i.e., $|\Delta W_{TP}|$, increasing if $L_{PS}$ is set to 50 μm or 100 μm. In other words, as the taper angle increases, the amount of phase change increases.

As $L_{PS}$ becomes shorter as illustrated in FIG. 5, a change of $\Delta\phi$ with respect to $|\Delta W_{TP}|/W$ becomes milder and more nonlinear. With $L_{PS}$ of 50 μm, a change of $\Delta\phi$ with respect to $|\Delta W_{TP}|/W$ becomes milder in particular in a region where $\Delta\phi$ is lower than 90 degrees.

In one embodiment, the length of the second phase shifter region 7, $L_{PS}$, is set to be about 50 μm or less.

According to the first embodiment, the first phase shifter region 6 serves as a narrow-width-tapered phase shifter and the second phase shifter region 7 serves as a wide-width-tapered phase shifter. In other words, the first phase shifter region 6 delays the phase of the optical signal while the second phase shifter region 7 advances the phase of the optical signal. The phase change $\Delta\phi$ on the first phase shifter region 6 is negative while the phase change $\Delta\phi$ on the second phase shifter region 7 is positive. The phase change $\Delta\phi$ of the first phase shifter region 6 and the phase change $\Delta\phi$ of the second phase shifter region 7 are opposite in sign.

According to the first embodiment, the taper angle of the narrow-width-tapered phase shifter 6 is approximately equal to the taper angle of the wide-width-tapered phase shifter 7. The outside external side-surface of the narrow-width-tapered phase shifter 6 is substantially parallel to the outside external side-surface of the wide-width-tapered phase shifter 7. The inside external side-surface of the narrow-width-tapered phase shifter 6 is substantially parallel to the inside external side-surface of the wide-width-tapered phase shifter 7. The narrow-width-tapered phase shifter 6 and the wide-width-tapered phase shifter 7 are aligned at a taper-reversal position in the lengthwise direction. More specifically, the narrowest width of the narrow-width-tapered phase shifter 6 and the widest width of the wide-width-tapered phase shifter 7 are aligned at substantially the same lengthwise position.

Figure 6:
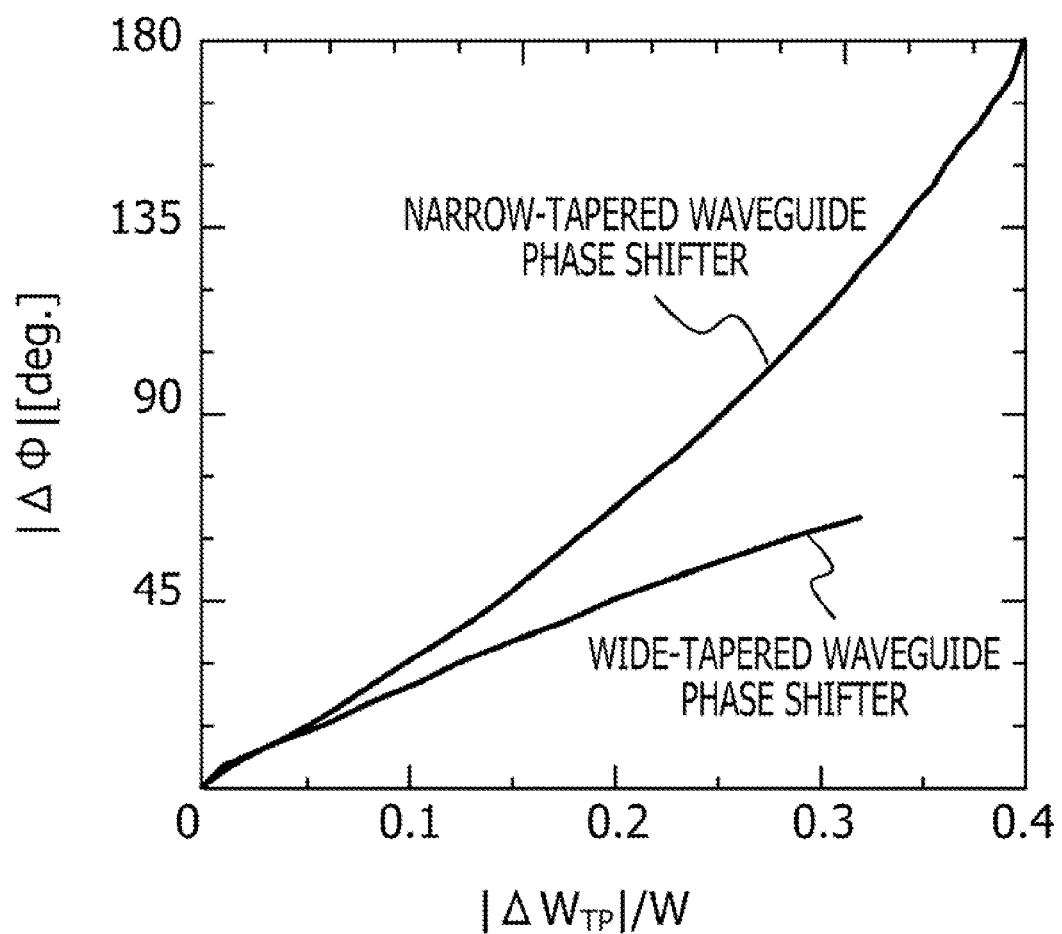
FIG. 6 illustrates a relationship between a rate of change and an amount of phase change of the narrow-width-tapered waveguide type phase shifter and the wide-width-tapered waveguide type phase shifter in the optical device of the first embodiment.

FIG. 6 illustrates a relationship between a rate of change $|\Delta W_{TP}|/W$ of the waveguide width and an amount of phase change $|\Delta\phi|$ in each of the narrow-width-tapered phase shifter 6 and the wide-width-tapered phase shifter 7.

In FIG. 6, W, $L_{TP}$, and $L_{PS}$ are set to be 2.0 μm, 25.0 μm, and 50.0 μm, respectively. The absolute value of $\Delta\phi$ is plotted to compare changes of Δϕ with respect to |ΔW$_{TP}$|/W between the two phase shifters 6 and 7.

As illustrated in FIG. 6, a change of Δϕ with respect to |ΔW$_{TP}$|/W in the wide-width-tapered phase shifter 7 is equal to or slightly smaller than a change of Δϕ with respect to |ΔW$_{TP}$|/W in the narrow-width-tapered phase shifter 6. The change of Δϕ with respect to |ΔW$_{TP}$|/W in the wide-width-tapered phase shifter 7 is milder than the change of Δϕ with respect to |ΔW$_{TP}$|/W in the narrow-width-tapered phase shifter 6. This tendency of Δϕ with respect to |ΔW$_{TP}$|/W is obtained regardless of the values of L$_{TP}$ and L$_{PS}$.

The optical splitting device 1 is manufactured of a semiconductor material. The dry etching technique is used to manufacture the narrow-width-tapered phase shifter 6 illustrated in FIG. 2 and the wide-width-tapered phase shifter 7 illustrated in FIG. 4. In the dry etching process, etching advances, in principle, depending on the shape and the area of an etching area regardless of a reaction gas. For this reason, as illustrated in FIG. 1, an area surrounded by the waveguides 4 and 5 including the phase shifters 6 and 7, and the optical couplers 2 and 3 suffers from a localized difference in the progress of etching. ΔW$_{TP}$, i.e., |ΔW$_{TP}$|/W varies in the wide-width-tapered phase shifter 7 and the narrow-width-tapered phase shifter 6. As a result, Δϕ also varies. The drying etching process has been discussed here. The same is true of another method such as the wet etching process.

Figure 7A:
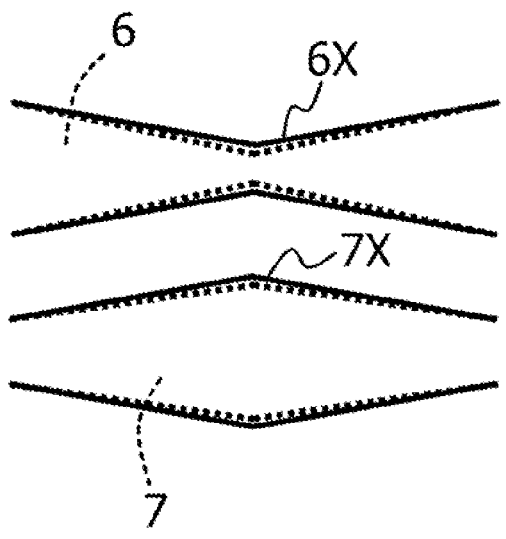
FIG. 7A illustrates a change in the taper shape caused by a manufacturing process of the wide-width-tapered waveguide type phase shifter and the narrow-width-tapered waveguide type phase shifter of the first embodiment.
Figure 7B:
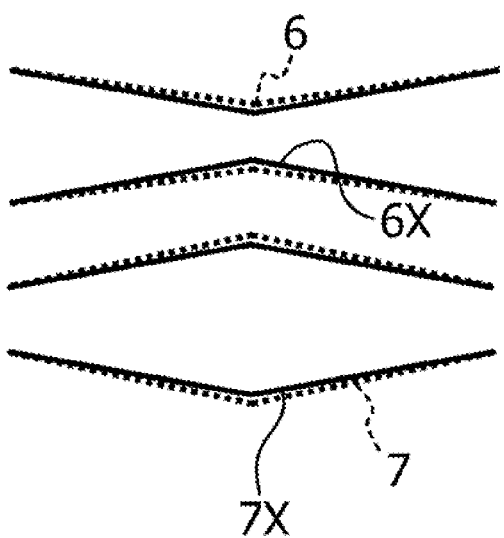
FIG. 7B illustrates a change in the taper shape caused by a manufacturing process of the wide-width-tapered waveguide type phase shifter and the narrow-width-tapered waveguide type phase shifter of the first embodiment.

FIGS. 7A and 7B illustrate a deviation δW$_{TP}$ from a specified ΔW$_{TP}$ in response to a change in ΔW$_{TP}$, i.e., |ΔW$_{TP}$|/W caused in a manufacturing process of the narrow-width-tapered phase shifter 6 and the wide-width-tapered phase shifter 7. FIGS. 7A and 7B illustrate, in solid lines, mask shapes for forming the narrow-width-tapered phase shifter 6 and the wide-width-tapered phase shifter 7 having a waveguide width with a specified ΔW$_{TP}$. FIGS. 7A and 7B illustrate, in broken lines, the narrow-width-tapered phase shifter 6 and the wide-width-tapered phase shifter 7 having a waveguide width with a deviation δW$_{TP}$.

If etching advances in a localized fashion, both the narrow-width-tapered phase shifter 6 and the wide-width-tapered phase shifter 7 have a waveguide width narrower than masks 6X and 7X, respectively, as illustrated in FIG. 7A. The specified waveguide width change ΔW$_{TP}$ increases by the deviation δW$_{TP}$ on the narrow-width-tapered phase shifter 6, and the specified waveguide width change ΔW$_{TP}$ decreases by the deviation δW$_{TP}$ on the wide-width-tapered phase shifter 7. In such a case, both the narrow-width-tapered phase shifter 6 and the wide-width-tapered phase shifter 7 may cause the phases of the respective optical signals to delay from specified phases.

If etching does not advance in a localized fashion, the waveguide widths of the narrow-width-tapered phase shifter 6 and the wide-width-tapered phase shifter 7 become wider from the masks 6X and 7X, respectively, as illustrated in FIG. 7B. The specified waveguide width changes ΔW$_{TP}$ decreases by the deviation δW$_{TP}$ on the narrow-width-tapered phase shifter 6, and the specified waveguide width change ΔW$_{TP}$ increases by the deviation δW$_{TP}$ on the wide-width-tapered phase shifter 7. In such a case, both the narrow-width-tapered phase shifter 6 and the wide-width-tapered phase shifter 7 may cause the phases of the respective optical signals to advance from specified phases.

If the narrow-width-tapered phase shifter 6 and the wide-width-tapered phase shifter 7 are used in combination, the narrow-width-tapered phase shifter 6 and the wide-width-tapered phase shifter 7 may operate in a complementary fashion regardless of the deviation from the specified ΔW$_{TP}$ caused in the manufacturing process.

Even if the deviation from the specified ΔW$_{TP}$ is caused in the manufacturing process, i.e., even if the taper shape changes, a relative phase difference resulting from the narrow-width-tapered phase shifter 6 and the wide-width-tapered phase shifter 7 prevents the amount of phase change from being deviated from the specified phase difference. The sum of the phase change Δϕ by the narrow-width-tapered phase shifter 6 and the phase change Δϕ by the wide-width-tapered phase shifter 7 serves as the phase change Δϕ of the optical splitting device 1. The phase change Δϕ of the optical splitting device 1 is thus prevented from being deviated from the specified phase change.

Even if a propagation coefficient varies in response to a deviation from the specified ΔW$_{TP}$ caused in the manufacturing process, the narrow-width-tapered phase shifter 6 and the wide-width-tapered phase shifter 7 operate in a complementary fashion. Characteristics degradation of the optical splitting device 1 caused by the manufacturing process is thus controlled.

Such an advantage becomes pronounced as the characteristics indicating a change of phase change Δϕ with respect to |ΔW$_{TP}$|/W on the narrow-width-tapered phase shifter 6 match the characteristics indicating a change of phase change Δϕ with respect to |ΔW$_{TP}$|/W on the wide-width-tapered phase shifter 7 illustrated in FIG. 6. For example, in a region where the phase change |Δϕ| is equal to or less than 22.5 degrees in FIG. 6, the characteristics indicating a change of phase change Δϕ with respect to |ΔW$_{TP}$|/W on the narrow-width-tapered phase shifter 6 substantially match the characteristics indicating a change of phase change Δϕ with respect to |ΔW$_{TP}$|/W on the wide-width-tapered phase shifter 7. If the phase change |Δϕ| is equal to or less than 22.5 degrees on L$_{PS}$ of 50 μm, |ΔW$_{TP}$| of the narrow-width-tapered phase shifter 6 and |ΔW$_{TP}$| of the wide-width-tapered phase shifter 7 are substantially equal to each other. As denoted by solid lines in FIGS. 7A and 7B, the narrow-width-tapered phase shifter 6 and the wide-width-tapered phase shifter 7 are approximately equal to each other in taper angle. More specifically, the outside external side-surface of the narrow-width-tapered phase shifter 6 is substantially parallel to the outside external side-surface of the wide-width-tapered phase shifter 7. The inside external side-surface of the narrow-width-tapered phase shifter 6 is substantially parallel to the inside external side-surface of the wide-width-tapered phase shifter 7.

Both the waveguide width of the narrow-width-tapered phase shifter 6 and the waveguide width of the wide-width-tapered phase shifter 7 may narrow in accordance with the deviation from the specified |ΔW$_{TP}$|/W, i.e., from the specified |ΔW$_{TP}$| as illustrated in FIG. 7A, or may widen in accordance with the deviation from the specified |ΔW$_{TP}$|/W, i.e., from the specified |ΔW$_{TP}$| as illustrated in FIG. 7B. In such a case, the deviations δW$_{TP}$ from the specified |ΔW$_{TP}$| are approximately equal to each other.

If both the waveguide width of the narrow-width-tapered phase shifter 6 and the waveguide width of the wide-width-tapered phase shifter 7 narrow, the narrow-width-tapered phase shifter 6 and the wide-width-tapered phase shifter 7 may cause the optical signals to delay from the specified phases thereof.

Conversely, if both the waveguide width of the narrow-width-tapered phase shifter 6 and the waveguide width of the wide-width-tapered phase shifter 7 widen, the narrow-width-tapered phase shifter 6 and the wide-width-tapered phase shifter 7 may cause the optical signals to advance from the specified phases thereof.

The relative phase difference caused by the narrow-width-tapered phase shifter 6 and the wide-width-tapered phase shifter 7 becomes a specified phase difference. More specifically, the phase change Δϕ of the optical splitting device 1 becomes a specified phase change.

Even if the taper angle and the waveguide width vary in the manufacturing process, the specified phase difference is obtained and the characteristics change of the optical splitting device 1 is alleviated because the narrow-width-tapered phase shifter 6 and the wide-width-tapered phase shifter 7 operate in a complementary fashion. A large manufacturing tolerance thus results.

Figure 8A:
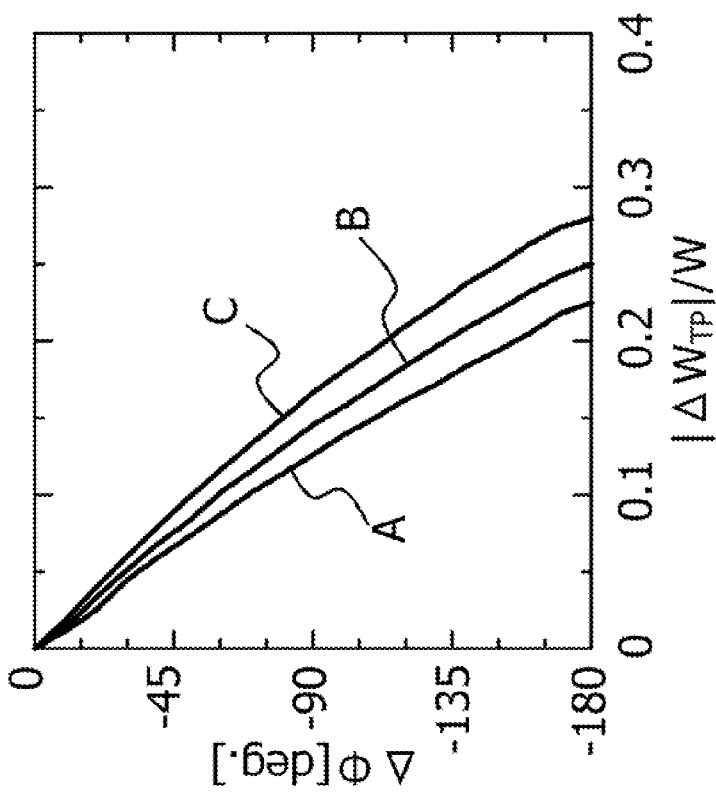
FIG. 8A illustrates characteristics of the narrow-width-tapered waveguide type phase shifter in the optical device of the first embodiment.
Figure 8B:
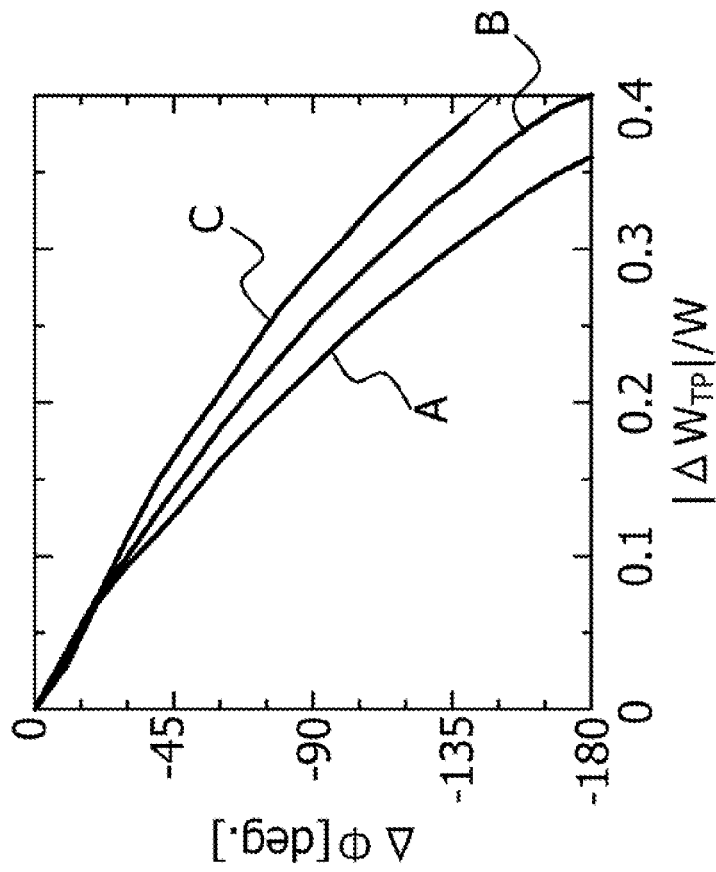
FIG. 8B illustrates characteristics of the narrow-width-tapered waveguide type phase shifter in the optical device of the first embodiment.

FIGS. 8A and 8B illustrate a relationship between the rate of change $|\Delta W_{TP}|/W$ of the waveguide width and the phase change Δϕ on the narrow-width-tapered phase shifter 6 when the waveguide width W at the input end and the output end of the narrow-width-tapered phase shifter 6 is changed.

FIG. 8A illustrates the characteristics of the narrow-width-tapered phase shifter 6 with the phase shifter length $L_{PS}$ being 50 μm ($L_{PS}$=50 μm). FIG. 8B illustrates the characteristics of the narrow-width-tapered phase shifter 6 with the phase shifter length $L_{PS}$ being 100 μm ($L_{PS}$=100 μm). Referring to FIGS. 8A and 8B, solid curved line A denotes the characteristics with the waveguide width W at the input end and the output end of the narrow-width-tapered phase shifter 6 being 1.9 μm. Solid curved line B denotes the characteristics of the narrow-width-tapered phase shifter 6 with the waveguide width W being 2.0 μm, and solid curved line C denotes the characteristics of the narrow-width-tapered phase shifter 6 with the waveguide width W being 2.1 μm.

As illustrated in FIGS. 8A and 8B, if the waveguide width W narrows, the phase change Δϕ with respect to the rate of change $|\Delta W_{TP}|/W$ relatively increases regardless of the phase shift length $L_{PS}$. If the waveguide width W widens, the phase change Δϕ with respect to the rate of change $|\Delta W_{TP}|/W$ relatively decreases.

If the phase change of the optical splitting device 1 is equal to or lower than 45 degrees with the phase shift length $L_{PS}$ being 50 μm, the phase change Δϕ with respect to the rate of change $|\Delta W_{TP}|/W$ remains substantially unchanged regardless of the waveguide width W of the waveguide as illustrated in FIG. 8A. Accordingly, a large manufacturing tolerance results. More specifically, if the phase shift length $L_{PS}$ is 50 μm and the phase change Δϕ of the narrow-width-tapered phase shifter 6 is set to be equal to or smaller than 22.5 degrees, the phase changes Δϕ with respect to the rates of change $|\Delta W_{TP}|/W$ for waveguide widths W are substantially equal to each other, and the manufacturing tolerance is large.

FIGS. 8A and 8B illustrate the characteristics of the narrow-width-tapered phase shifter 6. The characteristics of the wide-width-tapered phase shifter 7 have a similar tendency. More specifically, the wide-width-tapered phase shifter 7 is slightly different from the characteristics of the narrow-width-tapered phase shifter 6, but if the phase change of the optical splitting device 1 is equal to or lower than 45 degrees with the phase shift length $L_{PS}$ being 50 μm, the phase change Δϕ with respect to the rate of change $|\Delta W_{TP}|/W$ may remain substantially unchanged regardless of the waveguide width W of the waveguide as illustrated in FIGS. 8A and 8B. The manufacturing tolerance may be large.

In one embodiment, the lengths of the first phase shifter region 6 and the second phase shifter region 7, i.e., the lengths of the narrow-width-tapered phase shifter 6 and the wide-width-tapered phase shifter 7 (phase shifter length) are set to be about 50 μm.

A specific structure of each semiconductor element of the optical splitting device 1 is described below with reference to FIG. 9.

As illustrated in FIG. 9, the optical splitting device 1, having a high mesa waveguide structure 11, includes an InP substrate 8, and a GaInAsP core layer 9 (with a bandgap wavelength λg=1.3 μm), and an InP cladding layer 10 arranged on the InP substrate 8.

The optical waveguide (channel) coupled to each of the input optical coupler 2 and the output optical coupler 3 has a waveguide width W of about 2.0 μm, and thus satisfies a single-mode condition. The optical splitting device 1 asymmetrically splits an optical signal at a ratio of 82:18.

The optical splitting device 1 having a structure as an optical semiconductor device is manufactured as described below.

As illustrated in FIG. 9, the undoped GaInAsP core layer 9 and the undoped InP cladding layer 10 are epitaxially grown in that order on the n-type InP substrate 8 through the metal organic chemical vapor deposition (MOCVD).

The undoped GaInAsP core layer 9 has a bandgap wavelength of about 1.30 μm and a layer thickness of about 0.3 μm. The undoped InP cladding layer 10 has a layer thickness of about 2.0 μm. The InP substrate 8 may be an undoped InP substrate. The clad layer 10 may be a p-type doped InP clad layer.

A $SiO_2$ film may be deposited on the surface of the wafer, which has been epitaxially grown as described above, using a deposition apparatus, and the resulting wafer is then patterned with a waveguide pattern through an optical aligning process. The waveguide pattern includes a pattern of a phase shifter having a taper shape. The waveguide pattern is defined by a photomask on an optical aligner. The optical splitting device 1 is also referred to as an optical splitting and multiplexing device.

The patterned $SiO_2$ film is dry-etched through the inductive coupled plasma-reactive ion etching (ICP-RIE) process. The high mesa waveguide strip structure 11 having a height of 3.0 μm may be arranged.

The optical splitting device 1 is thus manufactured through these manufacturing processes.

Figure 10:
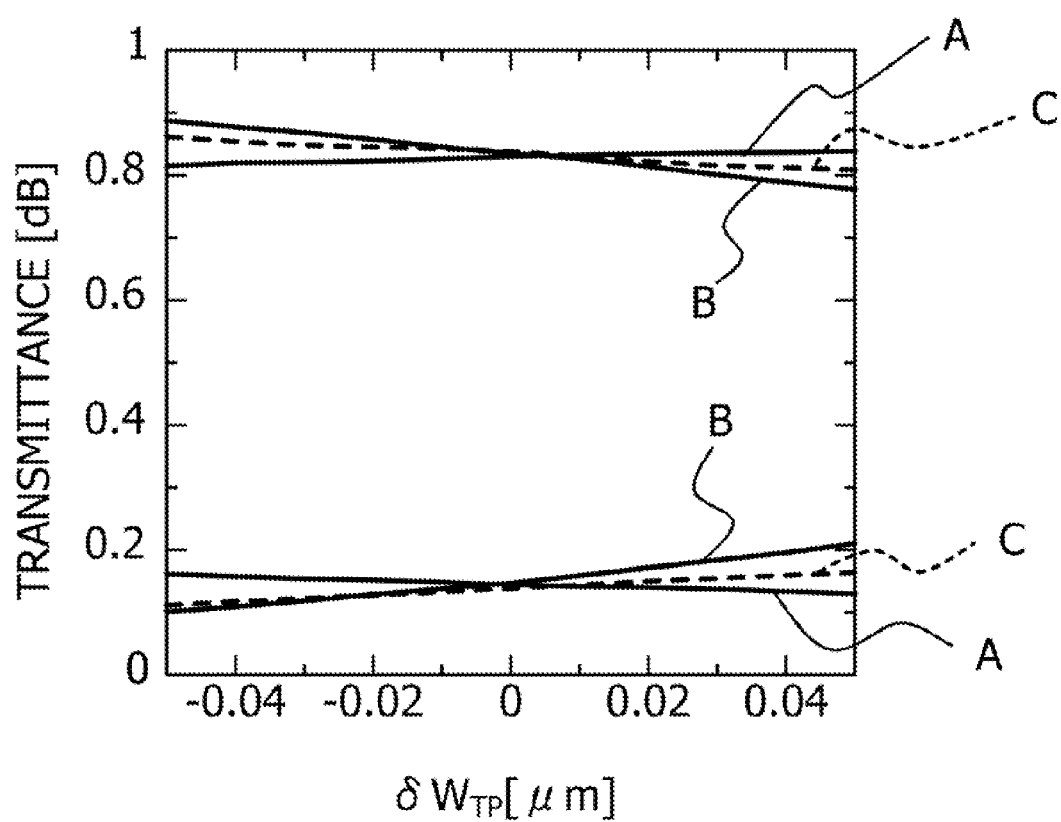
FIG. 10 illustrates a relationship between a deviation from a specified waveguide width changes and transmittance of rays output from the two output channels of the optical device when the amount of phase change of the optical device of the first embodiment is set to be 45 degrees.

FIG. 10 illustrates a relationship between a deviation $\delta W_{TP}$ from a specified $\Delta W_{TP}$ and transmittance of rays output from the two output channels of the optical device when the amount of phase change Δϕ of the optical device of the first embodiment is set to be 45 degrees.

Solid lines A denote the characteristics of the optical splitting device 1 in which the narrow-width-tapered phase shifter 6 and the wide-width-tapered phase shifter 7 are used with the phase changes Δϕ of the phase shifters 6 and 7 set to be 22.5 degrees. Solid lines B denote the characteristics of an optical splitting device in which only the narrow-width-tapered phase shifter 6 is arranged. Broken lines C denote the characteristics of an optical splitting device in which only the second phase shifter region 7 is arranged. After the width change $\Delta W_{TP}$ of the waveguide width W of the phase shifter is optimized such that the phase change Δϕ of the optical splitting device becomes 45 degrees, a deviation may occur through the manufacturing process. The deviation is defined as $\delta W_{TP}$).

If $\delta W_{TP}$=0 μm, the split ratio is a specific value (82:18) in any optical splitting device as illustrated in FIG. 10.

FIG. 10 illustrates that the split ratios of the optical splitting devices are greatly dependent on the phase shifter if $\delta W_{TP}$ is varied within a range of from −0.05 to 0.05 μm.

In the optical splitting device including only the narrow-width-tapered phase shifter 6, the split ratio linearly varies with respect to $\delta W_{TP}$, thereby reaching a rate of change of about ±6% as denoted by the solid lines B in FIG. 10. This is because the phase change Δϕ of the narrow-width-tapered phase shifter 6, i.e., the phase change Δφ of the optical splitting device, varies (see FIG. 3).

In the optical splitting device including only the wide-width-tapered phase shifter 7, the variation of the split ratio with respect to δ$W_{TP}$ is slightly smaller as denoted by the solid lines C in FIG. 10, but still reaches about ±3.5%. This is because the phase change Δφ of the wide-width-tapered phase shifter 7, i.e., the phase change Δφ of the optical splitting device, varies (see FIG. 5).

In contrast, in the optical splitting device 1, the split ratio of the optical splitting device 1 remains substantially constant as denoted by the solid lines A in FIG. 10 even if δ$W_{TP}$ varies within a range from −0.05 to 0.05 μm. The rate of change is controlled to within a range of ±1.8% or less.

In the optical splitting device 1, a variation of the split ratio with respect to δ$W_{TP}$ is controlled even if the specified Δ$W_{TP}$ suffers from the deviation δ$W_{TP}$ and the phase change Δφ varies in each of the narrow-width-tapered phase shifter 6 and the wide-width-tapered phase shifter 7. Since the phase changes Δφ take place in the narrow-width-tapered phase shifter 6 and the wide-width-tapered phase shifter 7 in a complementary fashion, the phase change Δφ of the optical splitting device 1 as the sum of changes does not vary greatly.

In the above discussion, the phase change Δφ in the optical splitting device is set to be about 45 degrees. The phase change Δφ is not limited to 45 degrees. Even if a different phase change Δφ is set, characteristics are similarly improved. Characteristics improvement is more pronounced in a range of phase change Δφ lower than 90 degrees than in a range of phase change Δφ equal to or higher than 90 degrees. Even in a range of phase change Δφ equal to or higher than 90 degrees, characteristics of the device are still more improved than in the other cases that do not employ both the narrow-width-tapered phase shifter 6 and the wide-width-tapered phase shifter 7 in combination.

If the angle and width of the waveguide of each of the phase shifters 6 and 7 deviate from the specified values thereof in the manufacturing process, characteristics degradation is controlled in the optical splitting device 1 of the embodiment. A large manufacturing tolerance thus results.

According to the embodiment, a combination of the narrow-width-tapered phase shifter 6 and the wide-width-tapered phase shifter 7 may improve the device characteristics of the optical splitting device 1.

In the optical splitting device with only the narrow-width-tapered phase shifter 6 as illustrated in FIG. 2, as the phase change Δφ increases, the waveguide width of the phase shifter 6 is narrowed and the width change Δ$W_{TP}$ of the waveguide width W of the phase shifter region 6 is increased. The optical splitting device may reach a cutoff state, and suffer from an excessive loss.

In the optical splitting device with only the wide-width-tapered phase shifter 7 as illustrated in FIG. 4, as the phase change Δφ increases, the waveguide width of the phase shifter 7 is widened and the width change Δ$W_{TP}$ of the waveguide width W of the phase shifter region 7 is increased. As a result, a high-order lateral mode may be excited, causing the device characteristics to be degraded.

In contrast, if the narrow-width-tapered phase shifter 6 and the wide-width-tapered phase shifter 7 are used in combination, the width change Δ$W_{TP}$ of the waveguide width W of each of the phase shifters 6 and 7, i.e., the value of |Δ$W_{TP}$|/W is simply set to be half. This combination use controls the generation of an excessive loss. The combination use also prevents a high-order transverse mode from being excited, thereby controlling device characteristics degradation.

Figure 22:
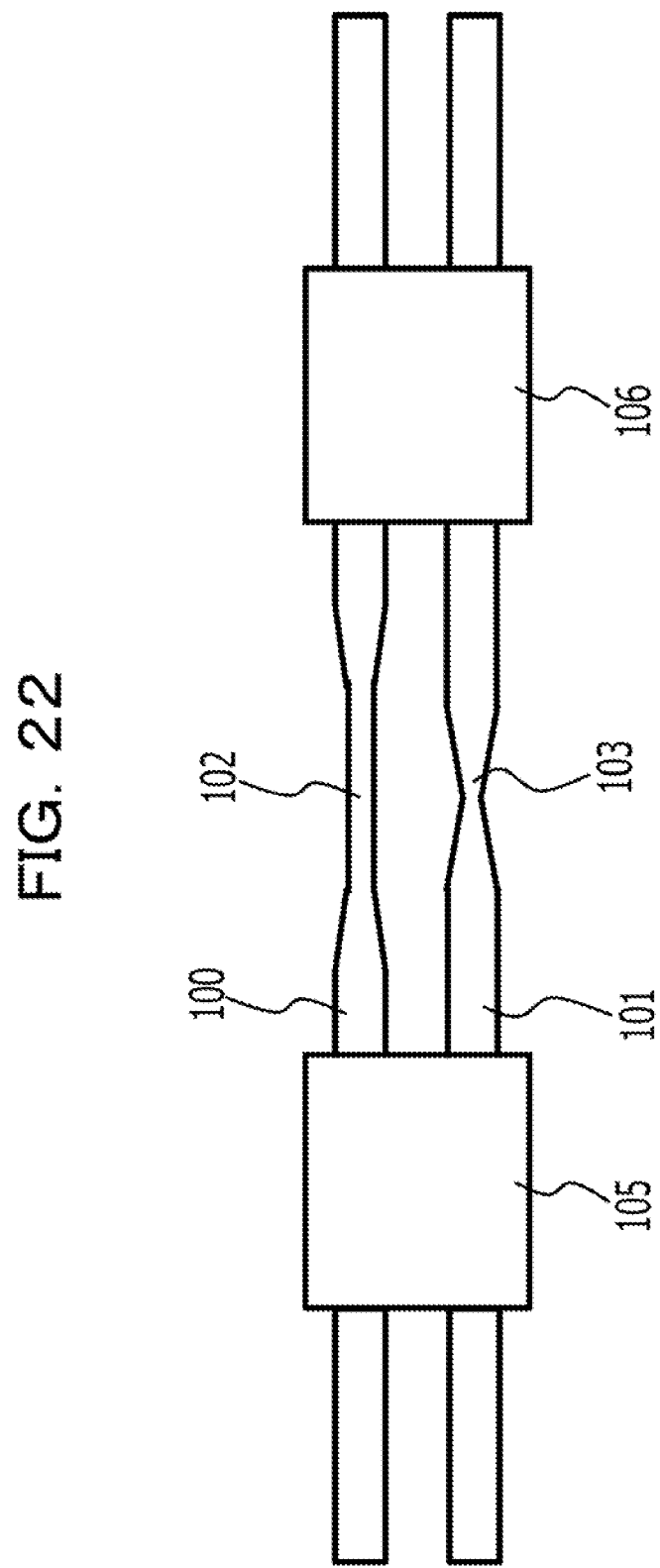
FIG. 22 diagrammatically illustrates an optical splitting device.
Figure 23:
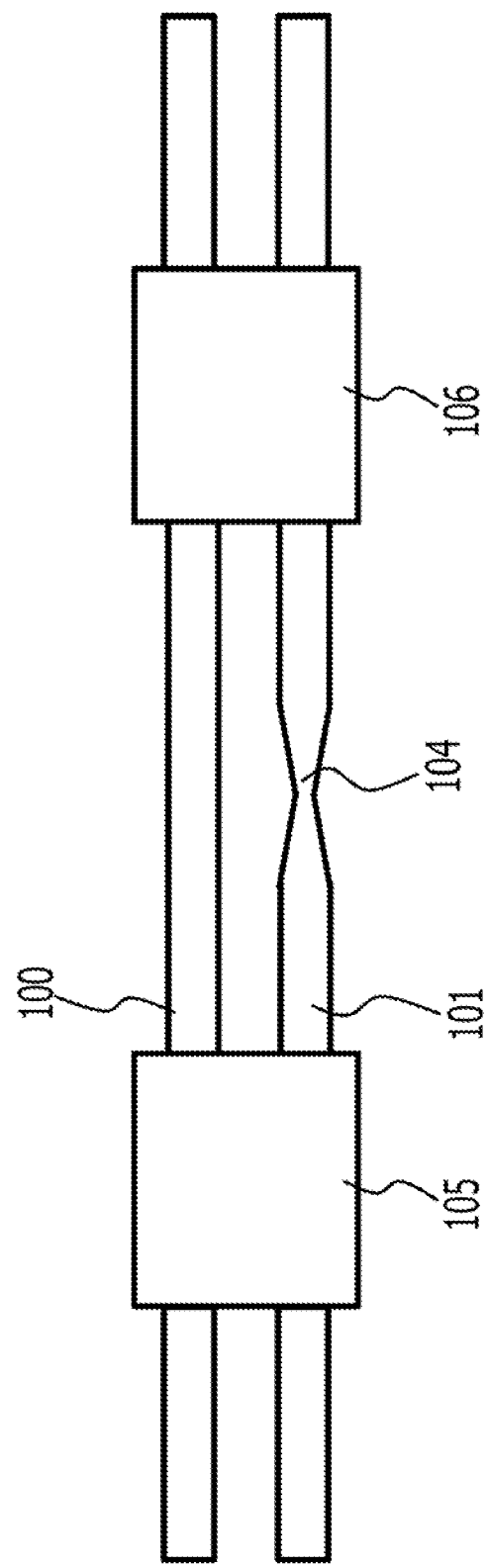
FIG. 23 diagrammatically illustrates an optical splitting device.

The structure of the narrow waveguide width of the two arms illustrated in FIG. 22 includes a long phase shifter length to provide a phase difference. In comparison with this structure, the combination use of the narrow-width-tapered phase shifter 6 and the wide-width-tapered phase shifter 7 allows the lengths of the phase shifters 6 and 7 to be shorter.

An arrangement illustrated in FIG. 24 may be contemplated in order to obtain any split ratio in the optical splitting device 1. An electrode 107 as a phase shifter may be arranged on a waveguide 100 of waveguides 100 and 100 between two 2:2 optical couplers 105 and 106, and a current or a voltage may be supplied via the electrode 107. A phase difference is thus provided in split optical signals. In such an arrangement, the application of the current or the voltage may consume power. In contrast, if the narrow-width-tapered phase shifter 6 and the wide-width-tapered phase shifter 7 are used in combination as in the embodiment, a specified phase difference is imparted to split optical signals without consuming extra power.

Figure 11:
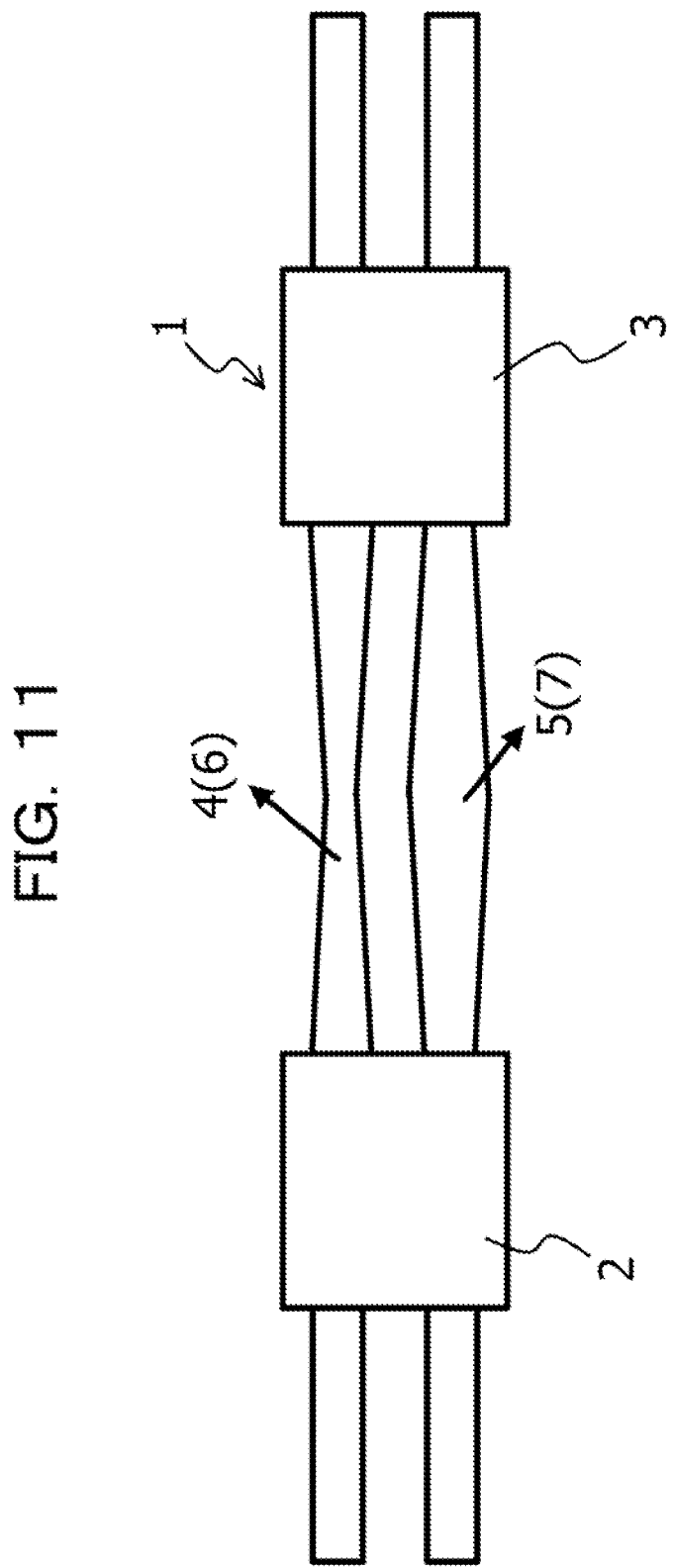
FIG. 11 diagrammatically illustrates a modification of the optical device of the first embodiment.

According to the embodiment, part of the first waveguide 4 serves as the first phase shifter region 6, and part of the second waveguide 5 serves as the second phase shifter region 7. The optical splitting device is not limited to this arrangement. Alternatively, as illustrated in FIG. 11, the first waveguide 4 in whole may serve as the first phase shifter region 6 and the second waveguide 5 in whole may serve as the second phase shifter region 7. In this case, as well, the taper-reversal positions of the first phase shifter region 6 and the second phase shifter region 7 may be aligned in the lengthwise direction. The first phase shifter region 6 and the second phase shifter region 7 may be substantially identical in taper angle. More specifically, the outside external side-surface of the narrow-width-tapered phase shifter 6 is substantially parallel to the outside external side-surface of the wide-width-tapered phase shifter 7. The inside external side-surface of the narrow-width-tapered phase shifter 6 is substantially parallel to the inside external side-surface of the wide-width-tapered phase shifter 7.

According to the embodiment, the first phase shifter region 6 and the second phase shifter region 7 have a width-tapered structure with a linearly tapered section. The phase shifters are not limited to this structure. The first phase shifter region 6 may be a wide-width-tapered phase shifter in which the waveguide is narrowed as it extends from the input end of the first phase shifter region 6 and then is widened as it extends from the narrow section to the output end of the first phase shifter region 6. The second phase shifter region 7 may be a wide-width-tapered phase shifter in which the waveguide is widened as it extends from the input end of the second phase shifter region 7 and then is narrowed as it extends from the wide section to the output end of the second phase shifter region 7.

Figure 12:
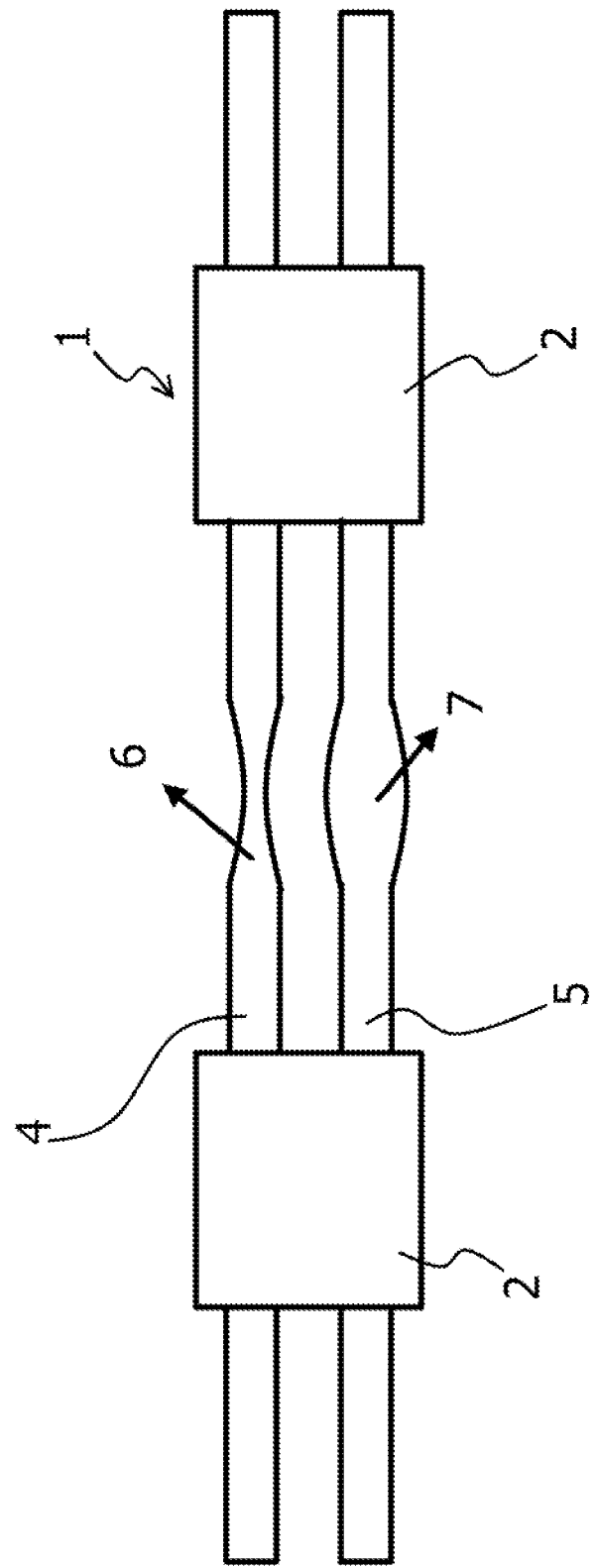
FIG. 12 diagrammatically illustrates another modification of the optical device of the first embodiment.

The first phase shifter region 6 and the second phase shifter region 7 may be another width-tapered waveguide, having a parabolic-tapered shape, or an elliptic-tapered shape, as illustrated in FIG. 12. In this case, the first phase shifter region 6 is a narrow-width-tapered phase shifter. The waveguide width of the first phase shifter region 6 narrows in a curve with the first phase shifter region 6 extending in a longitudinal direction from the input end of the first phase shifter region 6 to a lengthwise center position, and then widens in a curve with the first phase shifter region 6 extending in the longitudinal direction from the lengthwise center position to the output end of the first phase shifter region 6. The second phase shifter region 7 is a wide-width-tapered phase shifter. The waveguide width of the second phase shifter region 7 widens in a curve with the second phase shifter region 7 extending in a longitudinal direction from the input end of the second phase shifter region 7 to a lengthwise center position, and then narrows in a curve with the second phase shifter region 7 extending in the longitudinal direction from the lengthwise center position to the output end of the second phase shifter region 7. The first phase shifter region 6 and the second phase shifter region 7 are set to be aligned at a taper-reversal position in the lengthwise direction. The first phase shifter region 6 and the second phase shifter region 7 are set to be substantially identical in taper angle. The outside external side-surface of the narrow-width-tapered phase shifter 6 is substantially parallel to the outside external side-surface of the wide-width-tapered phase shifter 7. The inside external side-surface of the narrow-width-tapered phase shifter 6 is substantially parallel to the inside external side-surface of the wide-width-tapered phase shifter 7. This arrangement also provides the same advantages as those of the preceding embodiment.

Figure 13:
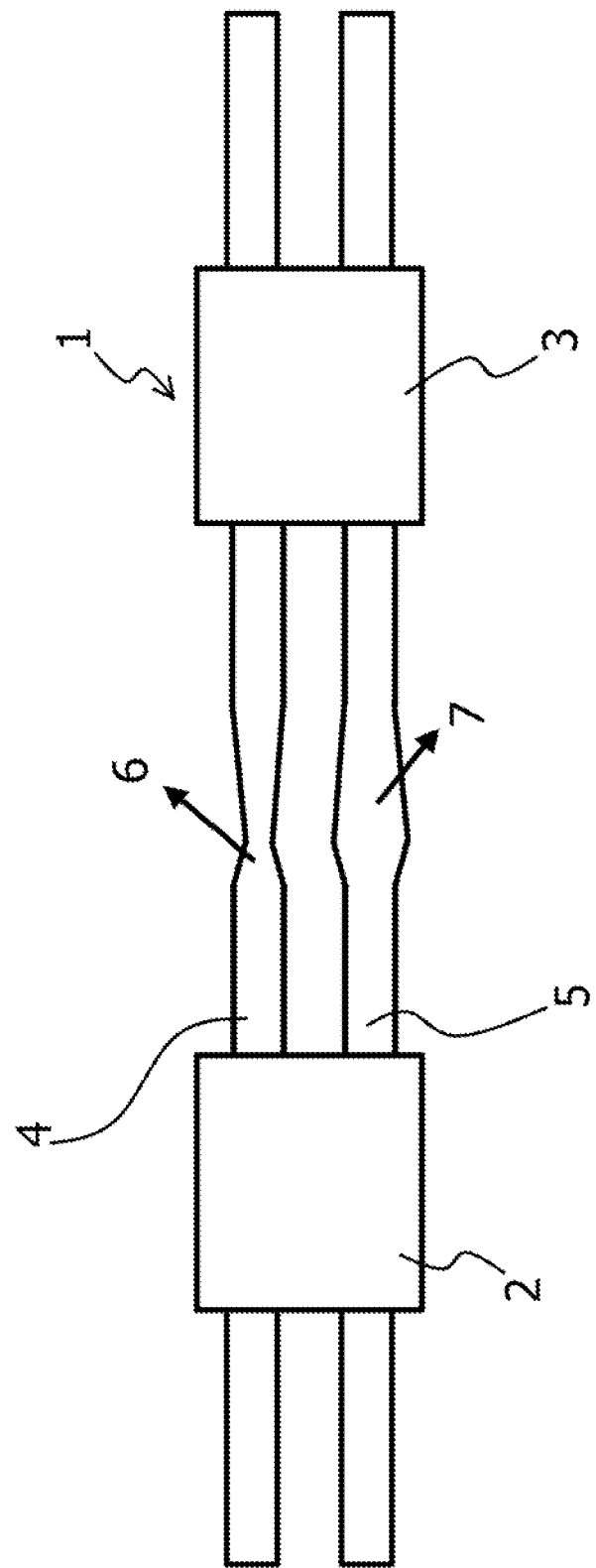
FIG. 13 diagrammatically illustrates still another modification of the optical device of the first embodiment.

According to the embodiment, each of the first phase shifter region 6 and the second phase shifter region 7 has a waveguide structure symmetrical with respect to the lengthwise center position. The optical splitting device is not limited to this arrangement. For example, each of the first phase shifter region 6 and the second phase shifter region 7 has a waveguide structure asymmetrical with respect to the lengthwise center position as illustrated in FIG. 13. The taper length may not be half the phase shifter length. The taper-reversal position of the taper shape, i.e., the position of the narrowest width of the waveguide, or the position of the widest width of the waveguide may be shifted from the lengthwise center position. In such a case, as well, the taper-reversal positions of the waveguides of the first phase shifter region 6 and the second phase shifter region 7 are set to be aligned in the lengthwise direction. The first phase shifter region 6 and the second phase shifter region 7 are set to be substantially identical in taper angle. The outside external side-surface of the narrow-width-tapered phase shifter 6 is substantially parallel to the outside external side-surface of the wide-width-tapered phase shifter 7. The inside external side-surface of the narrow-width-tapered phase shifter 6 is substantially parallel to the inside external side-surface of the wide-width-tapered phase shifter 7. The taper-reversal position of the taper shape falls within a range where the taper shape varies in a heat insulated state. In other words, the waveguide width gradually changes such that a high-order transverse mode is not excited by a sharp change in the waveguide width. This arrangement also provides the same advantages as those of the preceding embodiment.

The above-described embodiments are applied to the optical splitting devices splitting the optical signal at any split ratio. They are not limited to this arrangement.

In the above-described embodiments, the optical splitting device asymmetrically splits the optical signal at an unbalanced split ratio (82:18, for example). The embodiments are applicable to an optical splitting device that splits an optical signal at a balanced split ratio.

Figure 14:
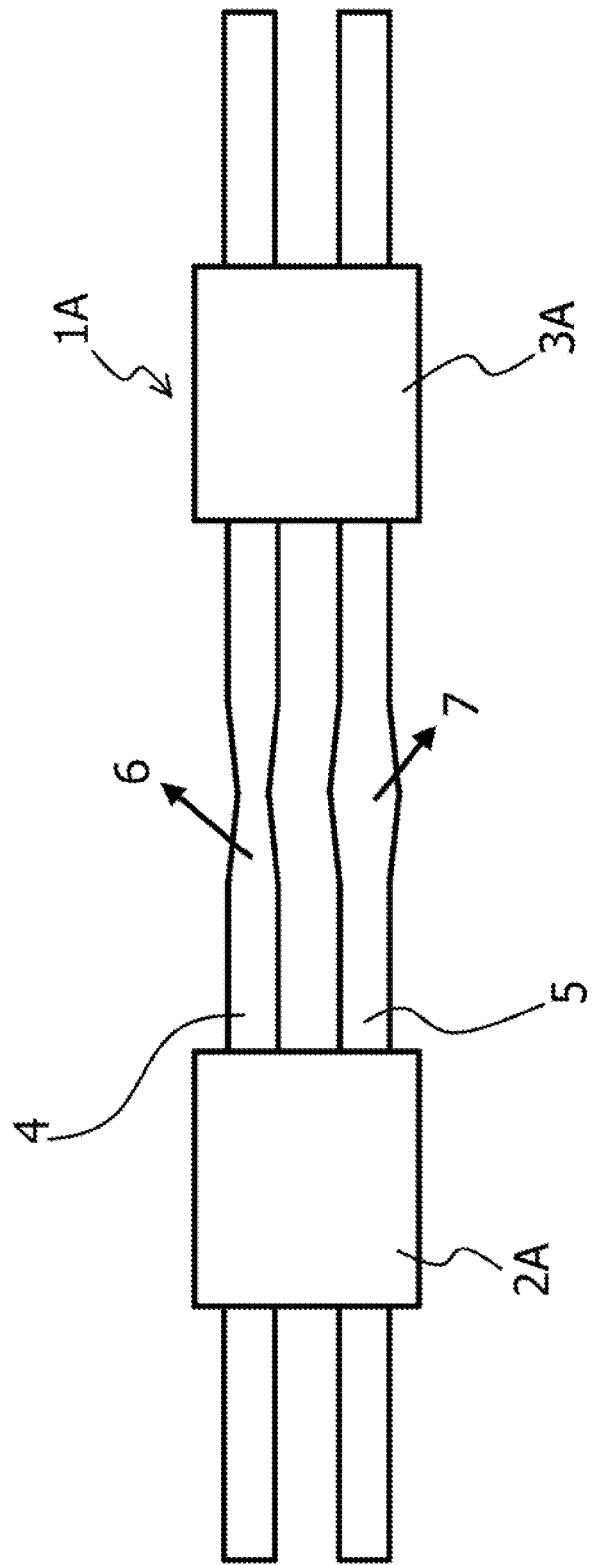
FIG. 14 diagrammatically illustrates still another modification of the optical device of the first embodiment.

The embodiments may be applicable to a Mach-Zehnder optical device. For example, the embodiments may be applicable to a Mach-Zehnder modulator 1A illustrated in FIG. 14. In the embodiment, an input optical coupler (first coupler) may be a 2:2 optical coupler 2A having two channels at the input side thereof and two channels at the output side thereof. An output optical coupler (second coupler) may be a 2:2 optical coupler 3A having two channels at the input side thereof and two channels at the output side thereof.

The embodiments are applicable to an optical device based on optical interference of optical signals having a phase difference therebetween. The embodiments are thus applicable to an optical device included in an interferometer other than a Mach-Zehnder interferometer, i.e., applicable to an interferometer circuit other than a Mach-Zehnder optical circuit.

An optical hybrid circuit 12 of a second embodiment is discussed with reference to FIGS. 15 and 16.

The optical hybrid circuit 12 as an optical device is described below.

The optical hybrid circuit 12 of the second embodiment is a 90-degree hybrid circuit used to identify (demodulate) phase-modulation information of a quadrature phase shift keying (QPSK) signal in an optical transmission system (optical communication system).

Figure 15:
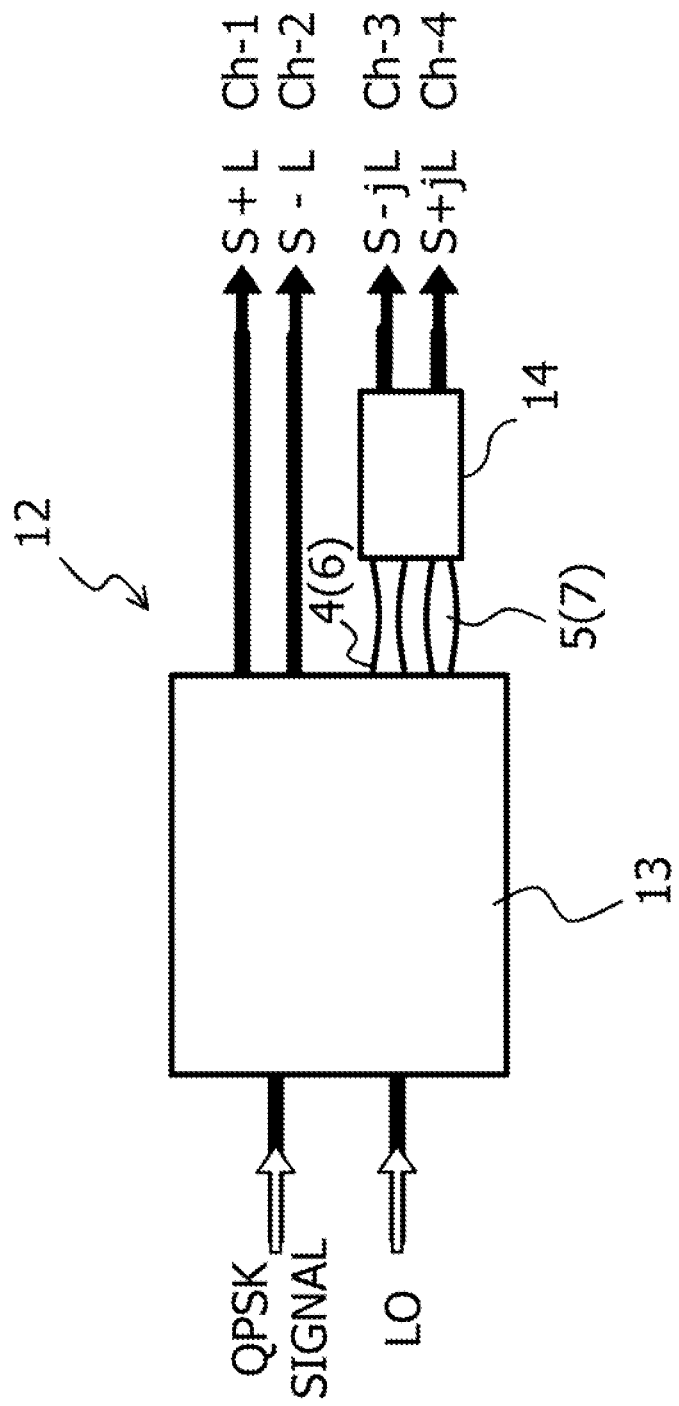
FIG. 15 diagrammatically illustrates a structure of an optical hybrid circuit of a second embodiment.

According to the embodiment, the optical hybrid circuit 12 includes a multi-mode interference (MMI) coupler 13 at a front stage and an optical coupler 14 at a subsequent stage, coupled in a cascade fashion as illustrated in FIG. 15. The optical hybrid circuit 12, including the MMI coupler 13 and the optical coupler 14, is a semiconductor device having a semiconductor waveguide structure. The MMI coupler 13 at the front stage is also referred to a first coupler, and the optical coupler 14 at the subsequent stage is also referred to as a second coupler.

The MMI coupler 13 is a 2:4 MMI coupler having two channels at the input side thereof and four channels at the output side thereof.

More specifically, the MMI coupler 13 is a 2:4 MMI coupler based on paired interference (PI). The centers of the two input channels are positioned at the one-third point of the MMI width from the top and at the two-third point of the MMI width from the top. In an MMI region, a high-order lateral mode of (3s−1) (s is a natural number equal to or larger than 1) may not be excited. This arrangement allows the device length to be short.

The 2:4 MMI coupler based on PI is used here. The embodiment is not limited to the 2:4 MMI coupler based on PI. The MMI coupler 13 is simply a central-symmetrical structure with the pair of input channels arranged at locations symmetrical with respect to the widthwise center position of the coupler. Optionally, a 2:4 MMI coupler based on general interference (GI) may be also used. In this coupler, the centers of the two input channels are positioned at locations off the one-third point of the MMI width from the top and at the two-third point of the MMI width from the top within a range that the central-symmetry of the MMI region is not destroyed. All the modes of the MMI region may be thus excited.

The optical coupler 14 at the subsequent stage is a 2:2 optical coupler having two channels at the input side thereof and two channels at the output side thereof, and has a function of delaying by 90 degrees rays propagating from the two input channels respectively to the two diagonally opposite output channels.

More specifically, the optical coupler 14 is a 2:2 MMI coupler. The 2:2 MMI coupler 14 is coupled to two channels (a pair of two adjacent output channels), i.e., the third channel and the fourth channel from the top on the output side of the 2:4 MMI coupler 13. The 2:2 MMI coupler 14 may be based on PI or GI.

The optical hybrid circuit 12 has two channels at the input side thereof and four output channels (Ch-1, Ch-2, Ch-3, and Ch-4) at the output side thereof.

The QPSK signal ray is input to one channel at the input side of the optical hybrid circuit 12, i.e., one channel at the input side of the 2:4 MMI coupler 13. In other words, the one channel at the input side of the optical hybrid circuit 12 is an input channel receiving the QPSK signal ray. A local oscillator (LO) signal is input to the other channel at the input side of the optical hybrid circuit 12, i.e., the other channel at the input side of the MMI coupler 13. In other words, the other channel at the input of the optical hybrid circuit 12 is an input channel receiving the LO ray.

The 2:4 MMI coupler 13 thus converts the QPSK signal into a pair of first optical signals in an in-phase state and a pair of second optical signals in an in-phase state. In other words, the QPSK signal is converted into the pair of first optical signals containing an in-phase component (I component) but not a quadrature phase component (Q component), and the pair of second optical signals containing an in-phase component (I component) but not a quadrature phase component (Q component).

In FIG. 15, S−L, S+L, S+jL, and S−jL represent how the LO light (L) is related in phase with respect to the phase of the signal light (S). Here, S−L and S+L represent a 180 degree mutually phase-shifted relationship, and S+jL and S−jL represent a 90 degree phase-shifted relationship to S+L and S−L, respectively.

The first optical signals in pair are output from the two channels as the first channel and the second channel at the output side of the 2:4 MMI coupler 13 from the top (a pair of first adjacent output channels), i.e., from the two channels as the first channel and the second channel at the output side of the optical hybrid circuit 12 from the top (Ch-1 and Ch-2). The second optical signals in pair are output from the two channels as the third channel and the fourth channel at the output side of the 2:4 MMI coupler 13 from the top (a pair of second adjacent output channels), and then input to the two channels as the first channel and the second channel at the input side of the optical coupler 14 from the top.

As illustrated in FIG. 15, the optical coupler 14 converts the pair of second optical signals into a pair of third optical signals in a quadrature phase state. In other words, the pair of second optical signals containing the in-phase component (I component) only is converted into the pair of third optical signals containing the quadrature phase component (Q component) only.

The third optical signals in pair are then output from the two channels as the first channel and the second channel at the output side of the 2:2 optical coupler 14 from the top, i.e., from the two channels as the third channel and the fourth channel at the output side of the optical hybrid circuit 12 (Ch-3 and Ch-4).

As illustrated in FIG. 15, the optical hybrid circuit 12 outputs the pair of first optical signals in the in-phase state (S−L, S+L), and the pair of third optical signals in the quadrature phase state (S−jL, S+jL).

The output intensity ratio of the signal rays output from the four output channels (Ch-1, Ch-2, Ch-3, and Ch-4) of the optical hybrid circuit 12 is different depending on the phase of the QPSK signal ($0, \pi, -\pi/2, +\pi/2$).

The 2:4 MMI coupler 13 converts the QPSK signal into the first optical signals in the in-phase state and the second optical signals in the in-phase state and, then the 2:2 optical coupler 14 converts the second optical signals into the third optical signals in the quadrature phase state. This process is performed for the reason described below.

Upon receiving the QPSK signal ray and the LO ray, the 2:4 MMI coupler 13 outputs the pair of first optical signals in the in-phase state from the two channels thereof, and the pair of second optical signals in the in-phase state from the other two channels thereof.

If the relative phase difference $\Delta\psi$ between the QPSK signal ray and the LO ray is 0 or $\pi$, the intensity ratio of the four output components (output intensity ratio) is 0:2:2:0 or 2:0:0:2, respectively. In other words, if the relative phase difference $\Delta\psi$ is 0 or $\pi$, the output becomes different in split ratio.

If the relative phase difference $\Delta\psi$ is $-\pi/2$ or $+\pi/2$, the output intensity ratio is 1:1:1:1. In other words, if the relative phase difference $\Delta\psi$ is $-\pi/2$ or $+\pi/2$, the output becomes the same in split ratio.

The optical hybrid circuit 12 thus functions as a 180-degree optical hybrid circuit but does not function as a 90-degree optical hybrid circuit. It is difficult in principle to cause the 2:4 MMI coupler 13 having a central-symmetrical structure based on PI to operate as a 90-degree hybrid circuit.

By cascading the 2:4 MMI coupler 13 having a central-symmetrical structure at a front stage and the 2:2 optical coupler 14 at a subsequent stage, an asymmetrical structure is thus constructed such that the optical hybrid circuit 12 functions as a 90-degree optical hybrid circuit.

With the third output channel and the fourth output channel of the 2:4 MMI coupler 13 coupled to the 2:2 optical coupler 14, only the output components from the third output channel and the fourth output channel of the 2:4 MMI coupler 13 are subject to a new phase change during propagation through the 2:2 optical coupler 14. In response to different relative phase differences $\Delta\psi$ of $-\pi/2$ and $+\pi/2$, the use of the 2:2 optical coupler 14 makes the split ratio different in the output signals. It is noted that the 2:2 optical coupler 14 provides similar characteristics as long as the 2:2 optical coupler 14 is based on GI or PI.

The optical hybrid circuit 12 thus outputs the first optical signals (S−L, S+L) in the in-phase state and the third optical signals (S−IL, S+jL) in the quadrature phase state.

If the 2:2 optical coupler 14 is merely coupled to the 2:4 MMI coupler 13 in a cascade fashion, the output components from the third and fourth output channels may be degraded in response to the relative phase difference $\Delta\psi$ of $-\pi/2$ or $+\pi/2$. This is because no phase matching is established between the output signals from the third and fourth output channels of the 2:4 MMI coupler 13 and the 2:2 optical coupler 14.

A 90-degree hybrid operation is reliably preformed with no characteristics degradation introduced in one embodiment. To this end, phase matching is established between the output signals from the third and fourth output channels of the 2:4 MMI coupler 13 and the 2:2 optical coupler 14.

More specifically, the phase of one ray (a pair of second optical signals) output from one of (or both of) the third and fourth output channels of the 2:4 MMI coupler 13 is adjusted such that the pair of second optical signals input to the 2:2 optical coupler 14 has a phase difference $\Delta\theta$ of $\pi/2+p^*\pi$ (p is an integer).

According to the embodiment, the third output channel and the fourth output channel of the 2:4 MMI coupler 13, to be coupled to the 2:2 optical coupler 14, are respectively coupled to the first phase shifter region 6 and the second phase shifter region 7. More specifically, the first waveguide 4 and the second waveguide 5, coupling the 2:4 MMI coupler 13 to the 2:2 optical coupler 14, respectively include the first phase shifter region 6 and the second phase shifter region 7.

The first phase shifter region 6 and the second phase shifter region 7 adjust the phases of the rays output from the third output channel and the fourth output channel of the 2:4 MMI coupler 13 (the pair of second optical signals) such that the phase difference $\Delta\theta$ between the rays input to the two channels at the input side of the 2:2 optical coupler 14 is $\pi/2+p^*\pi$ (p is an integer).

According to the embodiment, the phase difference $\Delta\theta$ between the pair of second optical signals output from the third and fourth output channels from the 2:4 MMI coupler 13 is about $\pi/4+p*\pi$ (p is an integer).

The first phase shifter region 6 and the second phase shifter region 7 thus imparts a phase difference of about $\pi/4+p*\pi$ to the pair of second optical signals output from the 2:4 MMI coupler 13 and thus phase-shifts the phase difference between the pair of second optical signals to be input to the 2:2 optical coupler 14 to $\pi/2+p*\pi$ (p is an integer).

The first phase shifter region 6 and the second phase shifter region 7 are identical in structure to the counterparts in the first embodiment and the modifications thereof.

More specifically, the first phase shifter region 6 is a narrow-width-tapered phase shifter. The first waveguide 4 between the output port of the 2:4 MMI coupler 13 and the input port of the 2:2 optical coupler 14 narrows in width as the first waveguide 4 extends from the output port of the 2:4 MMI coupler 13 to the lengthwise center position in the longitudinal direction, and widens as the first waveguide 4 extends from the lengthwise center position to the input port of the 2:2 optical coupler 14. The narrow-width-tapered phase shifter 6 is thus obtained. narrow-width-tapered phase shifter 6 delays the phase of the ray output from the third channel of the 2:4 MMI coupler 13 by 22.2 degrees, and delays the phase of the ray to be input to the first channel at the input side of the 2:2 optical coupler 14 by 45 degrees.

The second phase shifter region 7 is a wide-width-tapered phase shifter. More specifically, the second waveguide 5 between the output port of the 2:4 MMI coupler 13 and the input port of the 2:2 optical coupler 14 widens in width as the second waveguide 5 extends from the output port of the 2:4 MMI coupler 13 to the lengthwise center position in the longitudinal direction, and narrows as the second waveguide 5 extends from the lengthwise center position to the input port of the 2:2 optical coupler 14. The wide-width-tapered phase shifter 7 is thus obtained. The wide-width-tapered phase shifter 7 advances the phase of the ray output from the fourth channel of the 2:4 MMI coupler 13 by about 22.2 degrees, and advances the phase of the ray to be input to the second channel at the input side of the 2:2 optical coupler 14 by about 45 degrees.

The sum of the phase change $\Delta\phi$ caused by the first phase shifter region 6 and the phase change $\Delta\phi$ caused by the second phase shifter region 7 becomes about 45 degrees. The pair of second optical signals having a phase difference of about 45 degrees output from the third and fourth output channels of the 2:4 MMI coupler 13 is set to be about 90 degrees by the narrow-width-tapered phase shifter 6 and the wide-width-tapered phase shifter 7. In this way, the phase difference between the ray to be input to the first channel at the input side of the 2:2 optical coupler 14 and the ray to be input to the second channel at the input side of the 2:2 optical coupler 14 is thus set to be about 90 degrees.

The optical hybrid circuit 12 thus outputs the pair of first optical signals in the in-phase state (S−L, S+L) and the pair of third optical signals (S−jL, S+jL) in the quadrature phase state as illustrated in FIG. 15. The optical hybrid circuit 12 thus performs a 90-degree hybrid operation reliably. More specifically, the optical hybrid circuit 12 converts the QPSK signal into the pair of first optical signals containing the in-phase component (I component) only and the pair of third optical signals containing the quadrature component (Q component) only, thereby reliably performing the 90-degree hybrid operation.

The pair of first optical signals in the in-phase state, i.e., the pair of first optical signals containing the in-phase component only, is a pair of optical signals having a phase difference of 180 degrees therebetween. The pair of third optical signals in the quadrature phase state, i.e., the pair of third optical signals containing the quadrature phase component only is a pair of optical signals having a phase difference of 90 degrees from the pair of first optical signals. The pair of third optical signals is a pair of optical signals having a phase difference of 180 degrees therebetween.

If the relative phase difference $\Delta\psi$ is 0 or $\pi$, the intensity ratio of the optical hybrid circuit 12 is 0:2:1:1 or 2:0:1:1, respectively. If the relative phase difference $\Delta\psi$ is $-\pi/2$ or $+\pi/2$, the output intensity ratio of the optical hybrid circuit 12 is 1:1:2:0 or 1:1:0:2, respectively.

The optical hybrid circuit 12 thus gives outputs at different split ratios in response to the phase state of the QPSK signal. The optical hybrid circuit 12, including the first phase shifter region 6 and the second phase shifter region 7, substantially reduces excessive loss and crosstalk in the quadrature component. The optical hybrid circuit 12 thus functions reliably as a 90-degree hybrid circuit.

As discussed with reference to the first embodiment, characteristics of the quadrature phase component are degraded if the parameters of the phase shifter deviate from the specific values thereof.

In one embodiment, the crosstalk level in the output signal is controlled to 20 dB or lower in order to perform error-free optical signal processing.

Figure 16:
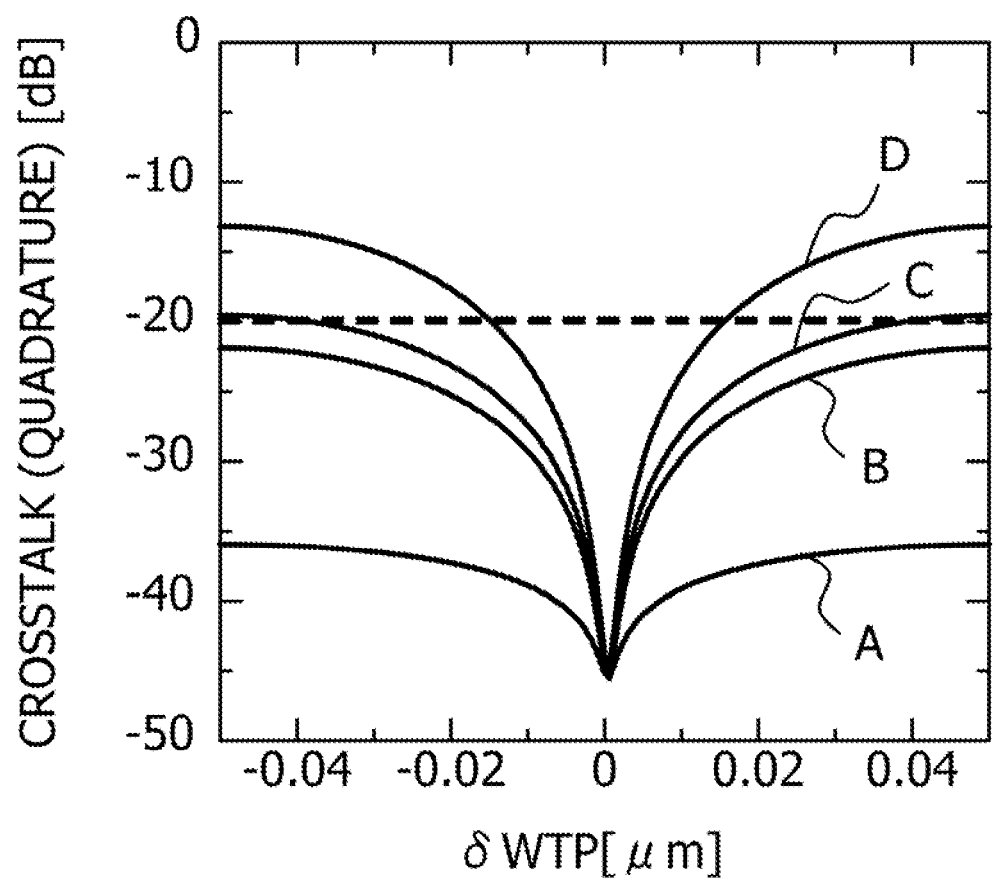
FIG. 16 illustrates a relationship between a deviation from a specified waveguide width changes of a waveguide width of each of a narrow-width-tapered waveguide type phase shifter and a wide-width-tapered waveguide type phase shifter arranged in the optical hybrid circuit of the second embodiment and a crosstalk between output signals in a quadrature phase state.

FIG. 16 illustrates a relationship between the deviation $\delta W_{TP}$ from the specified $\Delta W_{TP}$ of the waveguide width of each of the narrow-width-tapered phase shifter 6 and the wide-width-tapered phase shifter 7 arranged in the 90-degree optical hybrid circuit 12 of the embodiment and a crosstalk of output signals in the quadrature phase state.

Referring to FIG. 16, solid curved line A denotes the characteristics of the 90-degree hybrid circuit of the embodiment, namely, the 90-degree optical hybrid circuit 12 including the narrow-width-tapered phase shifter 6 and the wide-width-tapered phase shifter 7. Solid curved line B denotes the characteristics of a 90-degree hybrid circuit including the narrow-width-tapered phase shifter 6 having a phase shifter length $L_{PS}$ of 50 µm arranged only on one of the first waveguide 4 and the second waveguide 5. Solid curved line C denotes the characteristics of a 90-degree hybrid circuit including the narrow-width-tapered phase shifter 6 having a phase shifter length $L_{PS}$ of 100 µm arranged only on one of the first waveguide 4 and the second waveguide 5. Solid curved line D denotes the characteristics of a 90-degree hybrid circuit including the narrow-width-tapered phase shifter 6 having a phase shifter length $L_{PS}$ of 200 µm arranged only on one of the first waveguide 4 and the second waveguide 5.

As denoted by solid curved lines B, C, and D in FIG. 16, the crosstalk characteristics vary depending on the phase shifter length $L_{PS}$ even if only the narrow-width-tapered phase shifter 6 is arranged. The shorter the phase shifter length $L_{PS}$, the wider the permissible range of crosstalk with respect to $\delta W_{TP}$ becomes. This is because the shorter the phase shifter length $L_{PS}$, the milder the change of $\Delta\phi$ with respect to $|\Delta W_{TP}|/W$. The rate of change of $\Delta\phi$ with respect to $|\Delta W_{TP}|/W$ is reduced (see FIG. 3). Only the first phase shifter region 6 having a phase shifter length $L_{PS}$ of 50 µm barely restricts the crosstalk of the quadrature phase signal to −20 dB or less if $\delta W_{TP}$ is within a range of −0.05 to 0.05 µm.

In contrast, the 90-degree optical hybrid circuit 12 restricts the crosstalk of the quadrature phase signal to −35 dB or less if $\delta W_{TP}$ is within a range of −0.05 to 0.05 µm. The 90-degree optical hybrid circuit 12 thus provides a substantial improvement in the characteristics. A highly efficient demodulation operation may be performed on the QPSK modulated signal.

Even if the width and the angle of the waveguide of the first phase shifter region 6 and the second phase shifter region 7 are deviated from the specified values in the manufacturing process, the 90-degree optical hybrid circuit 12 of the embodiment controls the characteristics degradation. A large manufacturing tolerance is thus obtained.

The combination of the narrow-width-tapered phase shifter 6 and the wide-width-tapered phase shifter 7 of the embodiment improves device characteristics.

In the embodiment, the 2:4 MMI coupler 13 includes, but is not limited to, a 2:4 MMI coupler. The 2:4 MMI coupler 13 may be simply an MMI coupler that converts a quadrature phase-shift keying (QPSK) signal ray into a pair of first optical signals in an in-phase state and a pair of second optical signals in an in-phase state.

Figure 17:
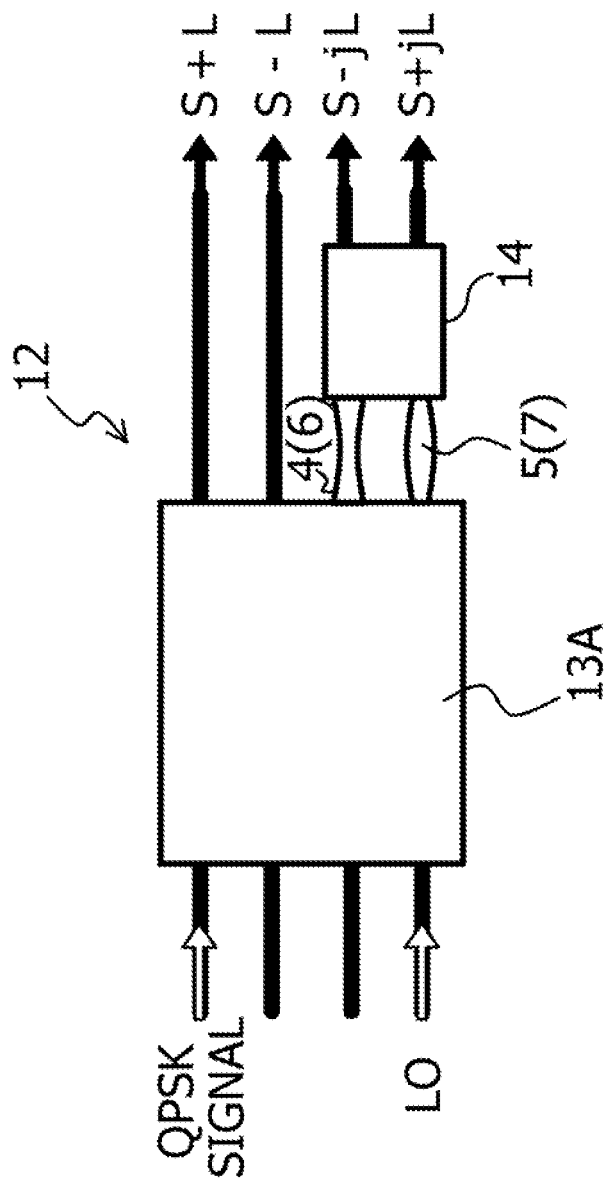
FIG. 17 diagrammatically illustrates a modification of the optical hybrid circuit of the second embodiment.

A 4:4 MMI coupler 13A may be substituted for the 2:4 MMI coupler 13 in the 90-degree optical hybrid circuit 12 of the embodiment as illustrated in FIG. 17. The 4:4 MMI coupler 13A has four channels at the input side thereof and four channels at the output side thereof. In the same manner as in the above-described embodiments, the optical hybrid circuit 12 operates as a 90-degree hybrid circuit with rays input to two channels (a pair of two input channels) arranged to be symmetrical with respect to the widthwise center position of the 4:4 MMI coupler 13A out of the four channels at the input side of the 4:4 MMI coupler 13A.

The 4:4 MMI coupler 13A is based on GI. The input channels and the output channels may be flexibly shifted in position within a range that does not destroy the central-symmetry of the MMI region. More specifically, as long as the first channel and the second channel at the input side from the top are symmetrical with the third channel and the fourth channel at the input side from the top with respect to the center axis of the MMI region, the positions of these channels are flexibly set. As long as the first channel and the second channel at the output side from the top are symmetrical with the third channel and the fourth channel at the output side from the top with respect to the center axis of the MMI region, the positions of these channels are flexibly set. However, the position of each channel may slightly affect the split characteristics.

In the embodiments, the 2:2 optical coupler 14 includes but is not limited to a 2:2 MMI coupler. The 2:2 optical coupler 14 at the subsequent state may be simply an optical coupler that converts one of the first optical signal and the second optical signal into a pair of third optical signals in a quadrature phase state.

In one modification, a directional coupler (for example, a 3 dB coupler like a 2:2 directional coupler) may be substituted for the 2:2 optical coupler 14 in the 90-degree optical hybrid circuit 12 of the above-described embodiments. In another modification, a two-mode interference coupler (such as a 2:2 two-mode interference coupler) may be substituted for the 2:2 optical coupler 14 in the 90-degree optical hybrid circuit 12 of the above-described embodiments. According to these modifications, the same advantages as those of the embodiments are provided. These modifications are also applicable to modification that employs the 4:4 MMI coupler 13A as a MMI coupler at the front stage.

The embodiments are based on, but not limited to, the method that the optical coupler 14 converts the pair of second optical signals in the in-phase state into the pair of third optical signals in the quadrature phase state.

The optical coupler 14 may convert the pair of first optical signals in the in-phase state into the pair of third optical signals in the quadrature phase state.

Figure 18:
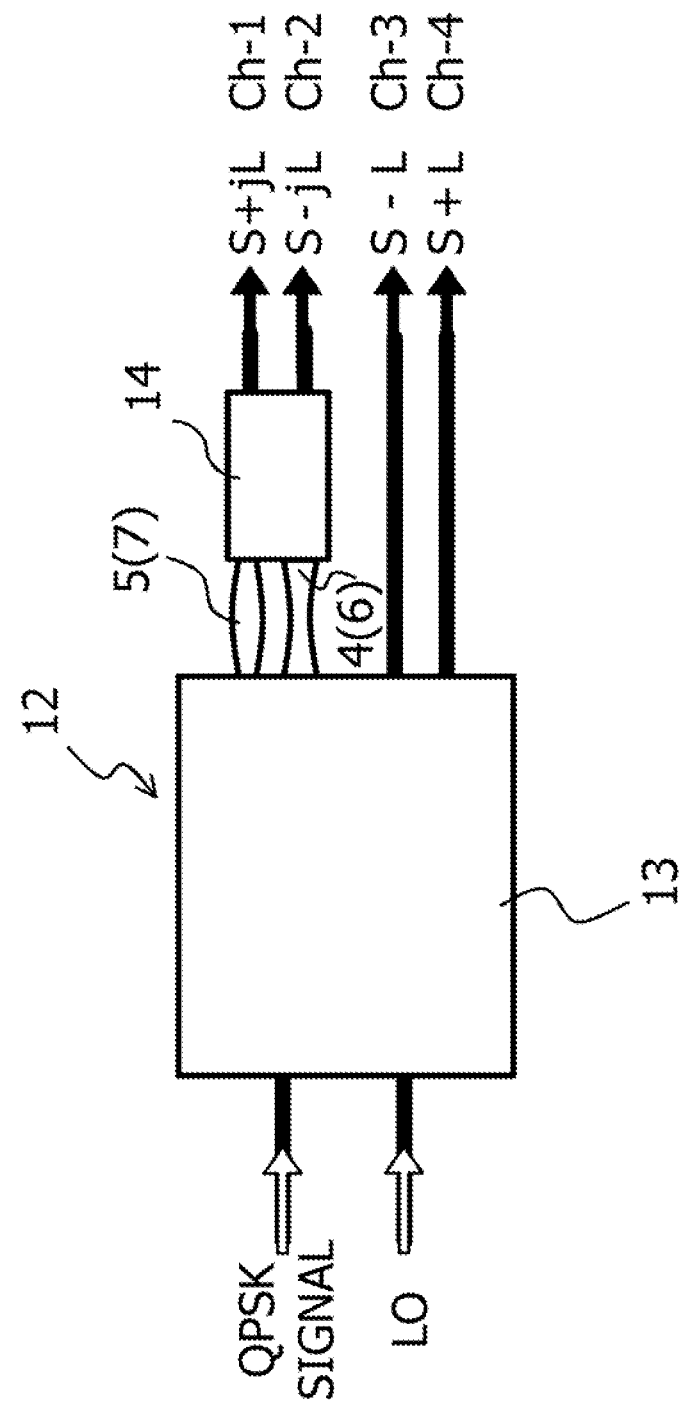
FIG. 18 diagrammatically illustrates another modification of the optical hybrid circuit of the second embodiment.

Referring to FIG. 18, the optical coupler 14 may convert the pair of first optical signals in the in-phase state into the pair of third optical signals in the quadrature phase state. The 2:2 optical coupler 14 is thus coupled to the first channel and the second channel at the output side of the 2:4 MMI coupler 13 (i.e., to the pair of adjacent output channels). A first channel and a second channel coupling the 2:4 MMI coupler 13 to the 2:2 optical coupler 14 are respectively referred to a first optical waveguide and a second optical waveguide, respectively.

As illustrated in FIG. 18, the first phase shifter region 6 and the second phase shifter region 7 are simply coupled to the pair of first output channels on the 2:4 MMI coupler 13 to which the 2:2 optical coupler 14 is to be coupled. As illustrated in FIG. 18, the second phase shifter region 7 is arranged at the second optical waveguide between the first output channel of the 2:4 MMI coupler 13 and the first input channel of the 2:2 optical coupler 14, and the first phase shifter region 6 is arranged at the first optical waveguide between the second output channel of the 2:4 MMI coupler 13 and the second input channel of the 2:2 optical coupler 14. The first phase shifter region 6 and the second phase shifter region 7 may simply have the same structure as the counterparts in the above embodiments. The first phase shifter region 6 and the second phase shifter region 7 in this arrangement impart a phase difference $\pi/4$ (phase change) between the two signal components to be input to the 2:2 optical coupler 14. Substantial characteristics improvement thus results as with the above-described embodiments.

In comparison with the embodiments, the positional relationship between the in-phase component and the quadrature phase component is thus reversed in the 90-degree hybrid output signals. If the relative phase differences $\Delta\psi$ are 0, $\pi$, $-\pi/2$, or $+\pi/2$, the output intensity ratio are 1:1:0:2, 1:1:2:0, 2:0:1:1, and 0:2:1:1, respectively.

An optical receiver and an optical transceiver of a third embodiment are described below with reference to FIG. 19.

Figure 19:
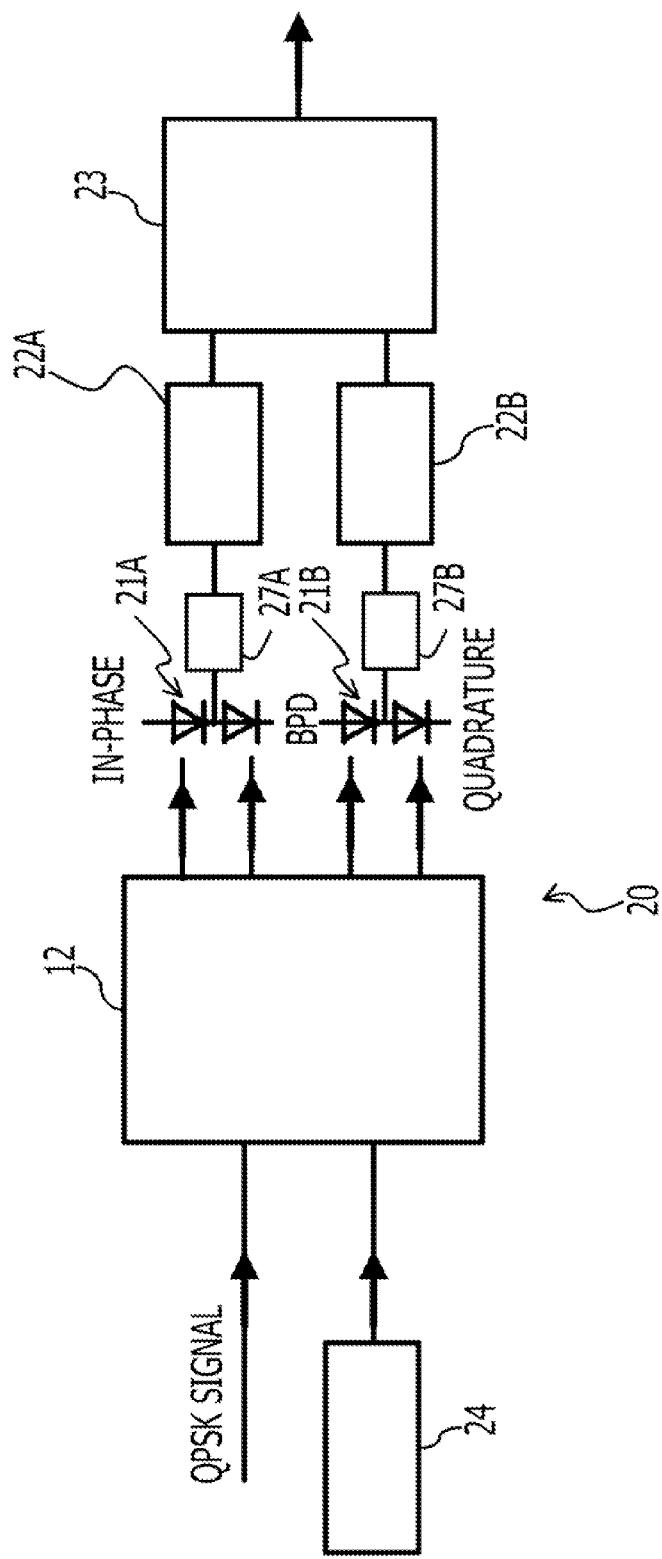
FIG. 19 diagrammatically illustrates an optical receiver of a third embodiment.

As illustrated in FIG. 19, the optical receiver of the third embodiment is a coherent optical receiver 20 including the optical hybrid circuit 12 of the second embodiment and the modifications of the second embodiment (the 90-degree optical hybrid circuits 12 illustrated in FIGS. 15, 17, and 18). The coherent optical receiver 20 converts the optical signal identified by the 90-degree optical hybrid circuit 12 and performs digital signal processing.

The coherent optical receiver 20 includes 90-degree optical hybrid circuit 12 of the second embodiment and the modifications of the second embodiment, balanced photodiodes (photoelectric converters) 21A and 21B, transimpedance amplifiers (TIAs) 27A and 27B, analog-to-digital (AD) converter circuits 22A and 22B, and digital arithmetic circuit (digital arithmetic unit) 23.

The optical hybrid circuit 12 includes the MMI coupler 13 (13A) converting the QPSK signal into the pair of first optical signals in the in-phase state and the pair of second optical signals in the in-phase state, and optical coupler 14 converting one of the first optical signal and the second optical signal into the pair of third optical signals in the quadrature phase state (see FIGS. 15, 17, and 18).

The MMI coupler here is the 2:4 MMI coupler 13 (or the 4:4 MMI coupler 13A). The optical coupler is the 2:2 optical coupler 14. The 90-degree optical hybrid circuit 12 further includes an optical semiconductor device.

In the embodiment as illustrated in FIG. 19, the QPSK signal ray is input to one input channel of the 2:4 MMI coupler 13 (or the 4:4 MMI coupler 13A) in the optical hybrid circuit 12, and the LO ray is input to the other input channel of the 2:4 MMI coupler 13 (or the 4:4 MMI coupler 13A). The one input channel of the 2:4 MMI coupler 13 (or the 4:4 MMI coupler 13A) in the 90-degree optical hybrid circuit 12 thus receives the QPSK signal, and the other input channel of the 2:4 MMI coupler 13 (or the 4:4 MMI coupler 13A) in the 90-degree optical hybrid circuit 12 receives the LO ray.

The coherent optical receiver 20 further includes a local optical signal oscillator (LO light source) 24 inputting the LO ray to the input of the 2:4 MMI coupler 13 (or the 4:4 MMI coupler 13A) in the 90-degree optical hybrid circuit 12.

If the QPSK signal ray and the LO ray time-synchronous with the QPSK signal ray (QPSK signal pulse) are input to the 90-degree optical hybrid circuit 12, the 90-degree optical hybrid circuit 12 gives the output signals having the split ratio that is different depending on the phase state of the optical signals, i.e., the phase difference $\Delta \psi$ between the QPSK signal ray and the LO ray. If the relative phase differences $\Delta \psi$ are $0, \pi, -\pi/2$, or $+\pi/2$, the output intensity ratios are 0:2:1:1, 2:0:1:1, 1:1:2:0, or 1:1:0:2, respectively.

The balanced photodiodes 21A and 21B photoelectrically convert pairs of optical signals output respectively from the multi-mode interference coupler 13 (13A) and the 2:2 optical coupler 14, in the optical hybrid circuit 12 into analog electrical (current) signals.

The balanced photodiodes 21A and 21B here are arranged at a stage subsequent to the optical hybrid circuit 12 for photoelectrical conversion and signal demodulation. Each of the balanced photodiodes 21A and 21B includes two photodiodes. If an optical signal is input to one photodiode only, a current corresponding to "1" flows. If an optical signal is input to the other diode only, a current corresponding to "−1" flows. If optical signals are input concurrently to the two photodiodes, no current flows. If the 90-degree optical hybrid circuit 12 inputs the optical signals different in output intensity ratio to the balanced photodiodes 21A and 21B in response to the relative phase difference $\Delta \psi$, the two balanced photodiodes 21A and 21B output electrical signals different in pattern. More specifically, the balanced photodiodes 21A and 21B identifies the phase information of the QPSK signal and converts the QPSK signal into the electrical signals different in pattern.

More specifically, the first balanced photodiode 21A is coupled to the first channel and the second channel at the output side of the optical hybrid circuit 12, and the second balanced photodiode 21B is coupled to the third channel and the fourth channel at the output side of the optical hybrid circuit 12. More specifically, the first balanced photodiode 21A is coupled to the first output channel and the second output channel (the pair of first adjacent output channels) outputting the pair of first optical signals in the in-phase state. The second balanced photodiode 21B is coupled to the third output channel and the fourth output channel (the pair of second adjacent output channels) outputting the pair of second optical signals (having a quadrature relationship to the first optical signals) in the in-phase state. The signals input to the balanced photodiodes 21A and 21B are also different in input state.

The transimpedance amplifiers 27A and 27B are arranged between the balanced photodiodes 21A and 21B and the AD converter circuits 22A and 22B, respectively. In other words, the transimpedance amplifiers 27A and 27B are respectively coupled to the balanced photodiodes 21A and 21B and the AD converter circuits 22A and 22B. The transimpedance amplifiers 27A and 27B respectively convert analog current signals output from the balanced photodiodes 21A and 21B into analog voltage signals (analog electrical signals).

The AD converter circuits 22A and 22B convert into digital electrical signals, the analog electrical signals, into which the transimpedance amplifiers 27A and 27B have converted the output signals from the balanced photodiodes 21A and 21B. More specifically, the AD converter circuits 22A and 22B convert the analog electrical signals output from the transimpedance amplifiers 27A and 27B into the digital electrical signals.

In response to the digital electrical signals output from the AD converter circuits 22A and 22B, the digital arithmetic circuit 23 performs an arithmetic process for estimating information of the received optical signal.

The optical hybrid circuit 12 is identical to the optical hybrid circuit 12 of the second embodiment and the modifications of the second embodiment, and the discussion thereof is omitted here.

Even if the angle and width of the waveguide of each of the phase shifters 6 and 7 deviate from the specified values thereof in the optical hybrid circuit 12, characteristics degradation is controlled in the optical receiver of the third embodiment. A large manufacturing tolerance thus results.

According to the third embodiment, the combination of the narrow-width-tapered phase shifter 6 and the wide-width-tapered phase shifter 7 may improve the device characteristics of the optical hybrid circuit 12.

The third embodiment and the modifications thereof described above include, but not limited to, the optical receiver. An optical transceiver having the structure of the above-described optical receiver may also be contemplated.

According to the third embodiment and the modifications thereof, the optical hybrid circuit 12 includes, but is not limited to, the MMI coupler 13 (13A) and the optical coupler 14. For example, the balanced photodiodes 21A and 21B may be integrated with a semiconductor device including the MMI coupler 13 (13A) and the optical coupler 14. In other words, the MMI coupler 13 (13A), the optical coupler 14 and the balanced photodiodes 21A and 21B are integrated into a unitary body.

An optical hybrid circuit 12A of a fourth embodiment is described below with reference to FIG. 20.

In the optical hybrid circuit 12 of the second embodiment, the QPSK signal and the LO ray are input in time-synchronization. The fourth embodiment is different from the second embodiment in that a differential quadrature phase-shift keying (DQPSK) signal is input to the optical hybrid circuit 12A.

The optical hybrid circuit 12A is a 90-degree hybrid circuit identifying phase modulation information of the DQPSK signal.

The optical hybrid circuit 12A includes an optical delay circuit 25 and a 1:2 optical coupler 26 having one channel at the input side thereof and two channels at the output side thereof, in addition to the structure of the optical hybrid circuit 12 of the first embodiment. More specifically, the optical hybrid circuit 12A includes the 1:2 optical coupler 26 at the front stage coupled to the 2:4 MMI coupler 13 via the optical delay circuit 25 in a cascade fashion. As in the second embodiment, the optical hybrid circuit 12A is a semiconductor device including the 2:4 MMI coupler 13 and the optical coupler 14. In FIG. 20, elements identical to those in the second embodiment (FIG. 15) are designated with the same reference numerals.

The optical delay circuit 25 is coupled to one input channel of the 2:4 MMI coupler 13 included in the optical hybrid circuit 12 of the second embodiment.

The 1:2 optical coupler 26 is coupled to the optical delay circuit 25 and the other input channel of the 2:4 MMI coupler 13. The 1:2 optical coupler 26 is a 1:2 MMI coupler.

More specifically, the length of one waveguide coupling one input channel of the 2:4 MMI coupler 13 to one output channel of the 1:2 optical coupler 26 is set to be longer than the length of the other waveguide coupling the other input channel of the 2:4 MMI coupler 13 to the other output channel of the 1:2 optical coupler 26.

In other words, a difference is introduced between the lengths of the waveguides coupling the two input ports of the 2:4 MMI coupler 13 and the two output ports of the 1:2 optical coupler 26.

The length of the one wavelength is set to be longer such that an optical path length difference corresponding to a delay of one bit of the DQPSK signal pulse is created. The one waveguide coupled to the one input channel of the 2:4 MMI coupler 13 included in the optical hybrid circuit 12 of the second embodiment is the optical delay circuit 25.

The DQPSK signal is input to one input channel of the 1:2 optical coupler 26. The input channel of the 1:2 optical coupler 26 thus receives the DQPSK signal ray. The DQPSK signal pulse branches into two paths through the 1:2 optical coupler 26. One DQPSK signal ray is delayed by one bit by the optical delay circuit 25, and then the two DQPSK signal rays are then input to the 2:4 MMI coupler 13 in time-synchronization. The relative phase difference between the DQPSK signal rays respectively input to the two input channels of the 2:4 MMI coupler 13 is one of the four phase differences $\Delta\psi$ described with reference to the second embodiment. As in the second embodiment, the 2:4 MMI coupler 13 and the subsequent circuit structure allow the output signals to be different in split ratio. The optical hybrid circuit 12A thus functions as a 90-degree hybrid circuit as in the second embodiment.

The rest of the fourth embodiment remains unchanged from the second embodiment, and the discussion thereof is omitted here. The fourth embodiment may be applicable to the second embodiment with the two DQPSK signal rays having a relative phase difference $\Delta\psi$ considered as the QPSK signal ray and the LO ray.

Even if the angle and width of the waveguide of each of the phase shifters 6 and 7 deviate from the specified values thereof, the optical hybrid circuit of the fourth embodiment controls characteristics degradation as in the second embodiment. A large manufacturing tolerance thus results.

According to the fourth embodiment, the combination of the narrow-width-tapered phase shifter 6 and the wide-width-tapered phase shifter 7 may improve the device characteristics as in the second embodiment.

According to the fourth embodiment, the 1:2 optical coupler 26 arranged at the prior stage of the 2:4 MMI coupler 13 includes, but is not limited to a 1:2 MMI coupler. For example, a Y split coupler or a 2:2 directional coupler may be used in place of a 1:2 MMI coupler. In such a case, a 90-degree hybrid operation is performed in the same manner as in the above described embodiments.

According to the fourth embodiment, the optical hybrid circuit 12A is arranged as an optical semiconductor device including the MMI coupler 13 and the optical coupler 14 as in the second embodiment. Optionally, the optical hybrid circuit 12A may be arranged as a semiconductor device including the MMI coupler 13, the optical coupler 14, the optical delay circuit 25, and the optical coupler 26.

The modification of the second embodiment (see FIGS. 17 and 18) is applicable to the fourth embodiment.

An optical receiver and an optical transceiver of a fifth embodiment are described below with reference to FIG. 21.

Figure 20:
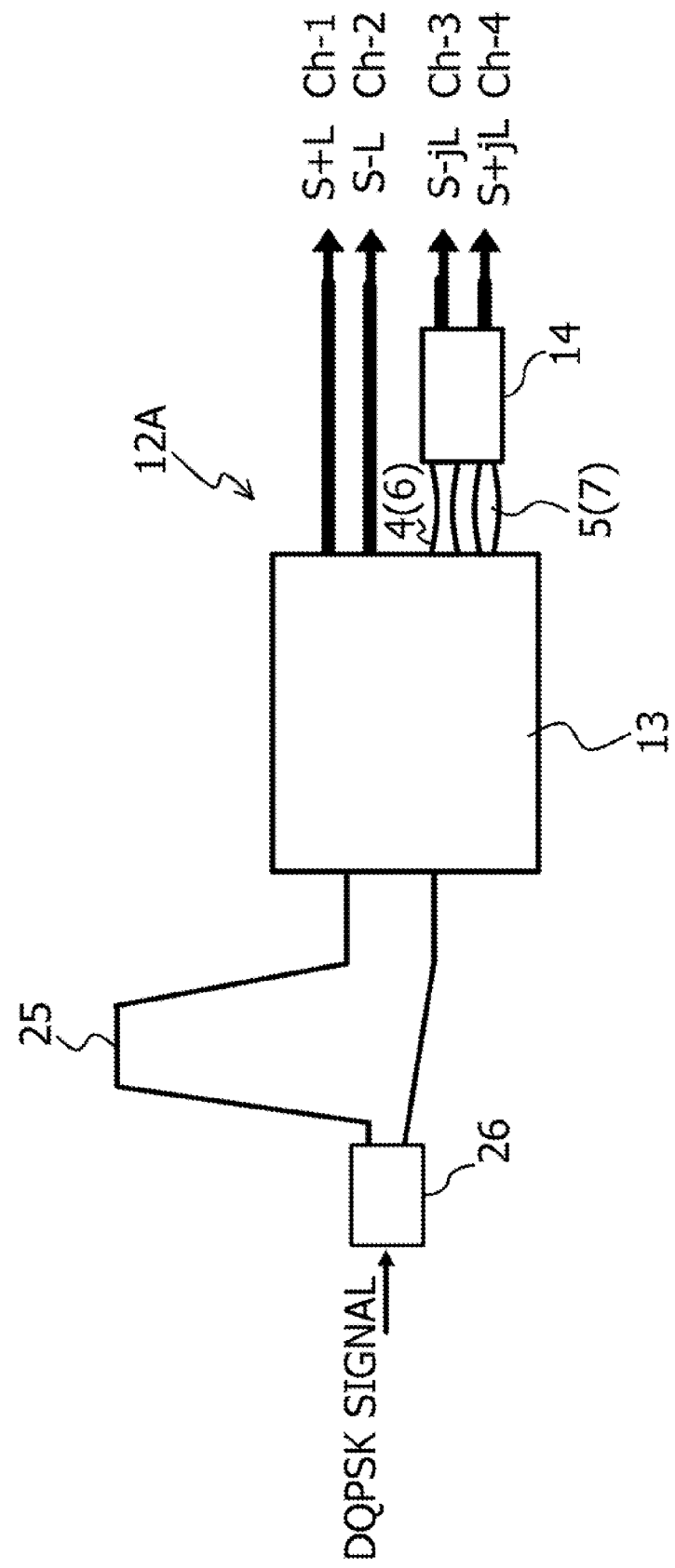
FIG. 20 diagrammatically illustrates an optical hybrid circuit of a fourth embodiment.
Figure 21:
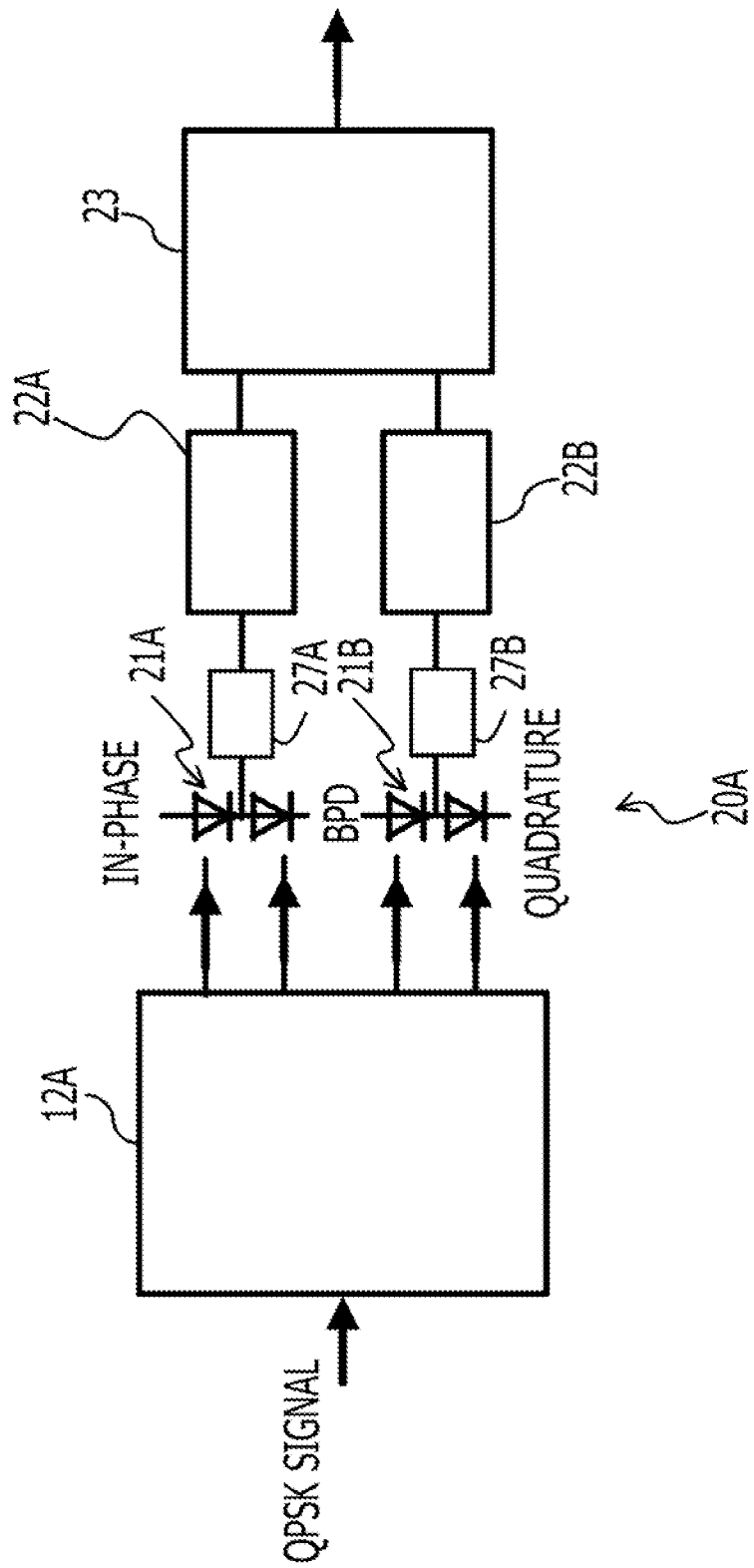
FIG. 21 diagrammatically illustrates an optical receiver of a fifth embodiment.

The optical receiver of the fifth embodiment is a coherent optical receiver 20A including the optical hybrid circuit 12A of the fourth embodiment and the modification thereof (the 90-degree hybrid circuit for the DQPSK signal illustrated in FIG. 20) as illustrated in FIG. 21. The coherent optical receiver 20A converts the optical signal identified by the 90-degree optical hybrid circuit 12A into an electrical signal to perform digital signal processing.

Referring to FIG. 21, the coherent optical receiver 20A includes the optical hybrid circuit 12A of the fourth embodiment and the modification thereof, balanced photodiodes (photoelectrical converters) 21A and 21B, transimpedance amplifiers (TIAs) 27A and 27B, AD converter circuits 22A and 22B, and digital arithmetic circuit (digital arithmetic unit) 23.

The optical hybrid circuit 12A is identical to the optical hybrid circuit 12A of the fourth embodiment and the modification of the fourth embodiment, and the discussion thereof is omitted here. The balanced photodiodes 21A and 21B, the transimpedance amplifiers 27A and 27B, the AD converter circuits 22A and 22B, and the digital arithmetic circuit 23 are respectively identical in structure and optical reception method to the counterparts in the third embodiment and the modification of the third embodiment (see FIG. 19), and the discussion thereof is omitted here. However, it is noted that the coherent optical receiver 20A includes no local optical signal oscillator. The fifth embodiment may be applicable to the third embodiment and the modification of thereof with the two DQPSK signal rays having a relative phase difference $\Delta\psi$ considered as the QPSK signal ray and the LO ray. As illustrated in FIG. 21, elements identical to those in the third embodiment (FIG. 19) and the fourth embodiment (FIG. 20) are designated with the same reference numerals.

The optical receiver of the fifth embodiment controls characteristics degradation, which may result from the deviation of the angle and width of the waveguide of each of the phase shifters 6 and 7 from the specified values thereof in the optical hybrid circuit 12A in the manufacturing process. A large manufacturing tolerance thus results.

According to the fifth embodiment, a combination of the narrow-width-tapered phase shifter 6 and the wide-width-tapered phase shifter 7 may improve the device characteristics.

The optical receiver has been discussed as the fifth embodiment and modifications of the fifth embodiment. An optical transceiver having the structure of the above-described optical receiver may also be contemplated as a modification to the fifth embodiment as in the modification to the third embodiment.

In the fourth embodiment, the optical hybrid circuit 12A includes a semiconductor including the MMI coupler 13 and the optical coupler 14. Optionally, the balanced photodiodes 21A and 21B may be integrated with the semiconductor including the MMI coupler 13 and the optical coupler 14. More specifically, the MMI coupler 13, the optical coupler 14, and the balanced photodiodes 21A and 21B may be integrated into a unitary body.

In the modification of the fourth embodiment, the optical hybrid circuit 12A includes a semiconductor including the MMI coupler 13, the optical coupler 14, the optical delay circuit 25, and the 1:2 optical coupler 26. Optionally, the balanced photodiodes 21A and 21B may be integrated with the semiconductor including the MMI coupler 13, the optical coupler 14, the optical delay circuit 25, and the 1:2 optical coupler 26. More specifically, the MMI coupler 13, the optical coupler 14, the optical delay circuit 25, the 1:2 optical coupler 26, and the balanced photodiodes 21A and 21B may be integrated into a unitary body.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical device, comprising:
    a first coupler configured to split an optical signal;
    a second coupler configured to cause optical signals to interfere with each other;
    a first waveguide configured to couple the first coupler to the second coupler, the first waveguide includes a first phase shifter region having a section narrower in width than an end of the first phase shifter region; and
    a second waveguide configured to couple the first coupler to the second coupler, the second waveguide includes a second phase shifter region having a section wider in width than an end of the second phase shifter region, wherein the first phase shifter region and the second phase shifter region are aligned at substantially the same length-wise position and have substantially the same length;
    wherein each of the first phase shifter region and the second phase shifter region has a longitudinal length of 50 µm or less; and
    wherein the first phase shifter region includes a tapered section extending from an input end of the first phase shifter region and then linearly tapering in a longitudinal direction to an end of the tapered section, where a reverse-tapered section begins linearly-reverse tapering and then extending to an output end of the first phase shifter region in the longitudinal direction.

2. The optical device according to claim 1, wherein the second phase shifter region includes a reverse-tapered section extending from an input end of the second phase shifter region and then linearly-reverse tapering in a longitudinal direction to an end of the reverse-tapered section, where a tapered section begins linearly tapering and then extending to an output end of the second phase shifter region in the longitudinal direction.

3. The optical device according to claim 1, wherein the whole of the first waveguide is the first phase shifter region, and wherein the whole of the second waveguide is the second phase shifter region.

4. The optical device according to claim 1, wherein a part of the first waveguide is the first phase shifter region, and wherein a part of the second waveguide is the second phase shifter region.

5. The optical device according to claim 1, wherein each of the first phase shifter region and the second phase shifter region comprises a waveguide structure that is symmetrical with respect to the lengthwise center position in the longitudinal direction thereof.

6. The optical device according to claim 1, wherein each of the first phase shifter region and the second phase shifter region comprises a waveguide structure that is asymmetrical with respect to the lengthwise center position in the longitudinal direction thereof.

7. The optical device according to claim 1, wherein each of the first coupler and the second coupler comprises a 2:2 coupler, the 2:2 coupler having two channels at the input side thereof and two channels at the output side thereof.

8. The optical device according to claim 1, wherein the first coupler comprises a 1:2 optical coupler, having one channel at the input side thereof, and two channels at the output side thereof, and
    wherein the second coupler comprises a 2:1 optical coupler, having two channels at the input side thereof and one channel at the output side thereof.

* * * * *